US010674474B2

(12) United States Patent
Poosamani et al.

(10) Patent No.: US 10,674,474 B2
(45) Date of Patent: Jun. 2, 2020

(54) SYSTEM AND METHOD TO DISCOVER DEVICE CONTEXT AND LOCATION USING CELLULAR SIGNAL INFORMATION

(71) Applicant: North Carolina State University, Raleigh, NC (US)

(72) Inventors: Nithyananthan Poosamani, Raleigh, NC (US); Injong Rhee, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 0 days.

(21) Appl. No.: 16/325,783

(22) PCT Filed: Aug. 16, 2017

(86) PCT No.: PCT/US2017/047222
§ 371 (c)(1),
(2) Date: Feb. 15, 2019

(87) PCT Pub. No.: WO2018/035267
PCT Pub. Date: Feb. 22, 2018

(65) Prior Publication Data
US 2019/0215796 A1    Jul. 11, 2019

Related U.S. Application Data

(60) Provisional application No. 62/376,234, filed on Aug. 17, 2016.

(51) Int. Cl.
*H04W 24/00* (2009.01)
*H04W 64/00* (2009.01)
(Continued)

(52) U.S. Cl.
CPC ............. *H04W 64/003* (2013.01); *G01S 5/02* (2013.01); *G01S 5/0252* (2013.01); (Continued)

(58) Field of Classification Search
CPC ..... H04W 64/003; H04W 8/22; H04W 4/029; H04W 52/245; H04W 4/33; H04W 4/20; (Continued)

(56) References Cited

U.S. PATENT DOCUMENTS 8,706,827 B1 * 4/2014 Noble .................... G10L 13/027
709/206
9,923,849 B2 * 3/2018 Govande ............... H04L 51/063
(Continued)

OTHER PUBLICATIONS

Poosamani, Nithyananthan, "Enabling Accurate and Energy-Efficient Context-Aware Systems for Smart Objects using Cellular Signals", North Carolina State University, ProQuest Dissertations Publishing, 2015 [online]: https://repository.lib.ncsu.edU/bitstream/handle/1840.16/10835/etd.pdf?sequence=2 (Year: 2015).*
(Continued)

*Primary Examiner* — Amancio Gonzalez
(74) *Attorney, Agent, or Firm* — Michael Best & Friedrich LLP

(57) ABSTRACT

System and method for receiving a plurality of cellular signals, determining a plurality of context data including at least one of an action data and a location data, mapping the plurality of cellular signals to the plurality of context data, generating a plurality of context signatures based on the mapping of the plurality of cellular signals to the plurality of context data, storing the plurality of context signatures, and determining a context profile associated with the communication device at an instance using a probability distribution of the stored plurality of context signatures.

15 Claims, 30 Drawing Sheets

(51) Int. Cl.
| | |
|---|---|
| *H04W 4/029* | (2018.01) |
| *H04W 52/24* | (2009.01) |
| *H04B 17/318* | (2015.01) |
| *G01S 5/02* | (2010.01) |
| *H04W 4/20* | (2018.01) |
| *H04W 4/33* | (2018.01) |
| *H04B 17/327* | (2015.01) |
| *H04B 17/336* | (2015.01) |
| *H04W 8/22* | (2009.01) |

(52) U.S. Cl.
CPC .......... *G01S 5/0278* (2013.01); *H04B 17/318* (2015.01); *H04B 17/327* (2015.01); *H04B 17/336* (2015.01); *H04W 4/029* (2018.02); *H04W 4/20* (2013.01); *H04W 4/33* (2018.02); *H04W 8/22* (2013.01); *H04W 24/00* (2013.01); *H04W 52/245* (2013.01); *H04W 64/00* (2013.01)

(58) Field of Classification Search
CPC .... H04W 64/00; H04W 24/00; H04B 17/336; H04B 17/327; H04B 17/318; G01S 5/0278; G01S 5/0252; G01S 5/02
USPC ...................................................... 455/456.1
See application file for complete search history.

(56) References Cited

U.S. PATENT DOCUMENTS

| | | | | |
|---|---|---|---|---|
| 10,146,748 | B1* | 12/2018 | Barndollar | G06F 16/444 |
| 2012/0108172 | A1* | 5/2012 | Bullen | G06Q 30/02 |
| | | | | 455/41.2 |
| 2013/0150073 | A1 | 6/2013 | Jovicic et al. | |
| 2013/0203447 | A1 | 8/2013 | Hannan et al. | |
| 2014/0032743 | A1* | 1/2014 | Hiscock | G06F 9/5027 |
| | | | | 709/224 |
| 2014/0337438 | A1* | 11/2014 | Govande | H04L 51/063 |
| | | | | 709/206 |
| 2015/0373501 | A1 | 12/2015 | Dribinski et al. | |

OTHER PUBLICATIONS

3GPP A Global Initiative, Specification, <http://www.3gpp.org/> webpage available as early as Jan. 25, 1999.
Ananthanarayanan et al., "Blue-Fi: Enhancing wi-fi performance using bluetooth signals," In ACM MobiSys, 2009, 13 pages.
Android, <https://www.android.com/intl/en_us/> webpage available as early as Sep. 13, 2014.
Apple ios, <https://www.apple.com/ios/> webpage available as early as Jun. 11, 2010.
Bahl et al., "Radar: An in-building rf-based user location and tracking system," in IEEE INFOCOM, 2000, 10 pages.
Balasubramanian et al., "Augmenting mobile 3G using WiFi," In ACM MobiSys, 2010, 13 pages.
Balasubramanian et al., "Energy consumption in mobile phones: A measurement study and implications for network applications," In IMC, 2009, 14 pages.
Blackberry os, http://us.blackberry.com/software/smartphones/blackberry-10-os. html/ webpage available as early as Feb. 20, 2017.
Bruno et al., "Design and analysis of a bluetooth-based indoor localization system," PersonalWireless Communications, 2003, 15 pages.
Carroll et al., "An analysis of power consumption in a smartphone," In USENIX, 2010, 14 pages.
Chakraborty et al., "On the effectiveness of movement prediction to reduce energy consumption in wireless communication," IEEE Transactions on Networking, 2006, 5:157-169.
Chen et al., "FM-based indoor localization," in ACM Mobisys, 2012, 13 pages.
Cheng et al., "TPS: A time-based positioning scheme for outdoor wireless sensor networks," In IEEE INFOCOM, 2004, pp. 2685-2696.
Chintalapudi et al., "Indoor localization without the pain," in ACM MobiCom, 2010, 12 pages.
Chon et al., "Mobility prediction-based smartphone energy optimization for everyday location monitoring," In ACM Sensys, 2011, 14 pages.
Cisco visual networking index: Global mobile data traffic forecast update, 2017-2022. <http://www.cisco.com/c/en/us/solutions/collateral/service-provider/visual-networking-index-vni/white_paper_c11-520862.html/> webpage available as early as Feb. 14, 2014.
Deshpande et al., "Predictive methods for improved vehicular wifi access," In ACM MobiSys, 2009, 14 pages.
Falaki et al., "Diversity in smartphone usage," In ACM MobiSys, 2010, 16 pages.
Fox et al., "Monte carlo localiza-tion: Efficient position estimation for mobile robots," In AAAI-99, 1999, 7 pages.
Gember et al., "Obtaining in-context measurements of cellular network performance," In IMC, 2012, 14 pages.
Gonzalez et al., "Understanding individual human mobility patterns," Nature, 2008, 453:779-782.
Haeberlen et al., "Practical robust localization over large-scale 802.11 wireless networks," In ACM Mobicom, 2004, 15 pages.
Huang et al., "Screen-off traffic characterization and optimization in 3g/4g networks," In IMC, 2012, 7 pages.
ICloud, Apple, <http://www.apple.com/icloudi> webpage available as early as Jun. 4, 2011.
International Search Report and Written Opinion for Application No. PCT/US2017/047222 dated Nov. 7, 2017 (14 pages).
Ji et al., "Ariadne: A dynamic indoor signal map construction and localization system," in MobiSys, 2006, 14 pages.
Kim et al., "Improving energy efficiency of Wi-Fi sensing on smartphones," In Infocom, 2011, 9 pages.
Laitinen et al., "Database correlation method for GSM location," in Vehicular Technology Conference, 2001. VTC 2001 Spring. IEEE VTS 53rd, 2001, pp. 2504-2508.
LaMarca et al., "Place lab: Device positioning using radio beacons in the wild," in Pervasive, 2005, 18 pages.
Lee et al., "Mobile data offloading: How much can wifi deliver?," In ACM Conext, 2010, 12 pages.
Leonard et al., "Simultaneous map building and localization for an autonomous mobile robot," Proceedings IROS '91:IEEE/RSJ International Workshop on Intelligent Robots and Systems, 1991, pp. 1442-1447.
Leontiadis et al., "From cells to streets: Estimating mobile paths with cellular-side data," in ACM CoNEXT, 2014, 12 pages.
Lim et al., "Zero-configuration indoor localization over ieee 802.11 wireless infrastructure," Wirel. Netw., 2010, 31 pages.
Manweiler et al., "Avoiding the rush hours: WiFi energy management via traffic isolation," In ACM MobiSys, 2011, 14 pages.
McCullough, Yuvraj Agarwal, Jaideep Chandrashekar, Sathyanarayan Kup-puswamy, Alex C. Snoeren, and Rajesh K. Gupta. Evaluating the effectiveness of model-based power characterization. In USENIX ATC, 2011.
Mittal et al., "Empowering developers to estimate app energy consumption," In ACM Mobicom, 2012, 11 pages.
Monsoon solutions, <www.msoon.com/LabEquipment/PowerMonitor/> webpage available as early as Mar. 7, 2011.
Ni et al., "Landmarc: Indoor location sensing using active RFID," Wireless Networking, 2003, 9 pages.
Nicholson et al., "Breadcrumbs: forecasting mobile connectivity," In ACM Mobicom, 2008, 12 pages.
Paek et al., "Energy-efficient rate-adaptive gps-based positioning for smartphones," In ACM Mobisys, 2010, 16 pages.
Pathak et al., "Fine-grained power modeling for smartphones using system call tracing," In ACM EuroSys, 2011, 15 pages.
Poosamani et al., "A practical and energy-efficient system to discover wi-fi hotspots using cellular signals," 2014, 13 pages.
Poosamani et al., "iSha: A fine-grained energy consumption analyzer system for wearable computing devices," 2014.

(56) References Cited

OTHER PUBLICATIONS

Poosamani et al., "Towards a Practical Indoor Location Matching System using 4G LTE PHY Layer Information," IEEE Percom Conference, Mar. 2015, 4 pages.
Poosamani et al., "Wi-fi hotspot auto-discovery: A practical & energy-aware system for smart objects using cellular signals," EAI Endorsed Transactions on Energy Web, 2015, 10 pages.
Poosamani, "Enabling Accurate and Energy-Efficient Context-Aware Systems for Smart Objects using Cellular Signals," Thesis, Aug. 18, 2015, 108 pages.
Prasithsangaree et al., "On indoor position location with wireless lans," In IEEE PIMRC, 2002, 5 pages.
Priyantha et al., "The cricket location-support system," in ACM Mobicom, 2000, 12 pages.
Ra et al., "Energy-delay tradeoffs in smartphone applications," In ACM Mobisys, 2010, 15 pages.
Rahmati et al., "Context-for-wireless: Context-sensitive energy-efficient wireless data transfer," In Acm Mobisys, 2007, 14 pages.
Rai et al., "Zee: Zero-effort crowdsourcing for indoor localization," In ACM Mobicom, 2012, 12 pages.
Robertson, M. Angermann, and B. Krach, "Simultaneous localization and mapping for pedestrians using only foot-mounted inertial sensors," in ACM Ubicomp, 2009, 4 pages.
Rozner et al., "NAPman: Network-assisted power management for wifi devices," In ACM MobiSys, 2010, 15 pages.
Ruckus, "Hotspot 2.0," <https://webresources.ruckuswireless.com/pdf/wp/wp-hotspot-2.0.pdf> 2014.
Schulman et al., "Bartendr: A practical approach to energy-aware cellular data scheduling," In Mobicom, 2010, 12 pages.
Sen et al., "You are facing the mona lisa: Spot localization using phy layer information," In ACM MobiSys, 2012, 14 pages.
Shih et al., "Wake on wireless: An event driven energy saving strategy for battery operated devices," In ACM Mobicom, 2002, 12 pages.
Simonite, "How wi-fi drains your cell phone," MIT Technology Review, <https://www.technologyreview.com/s/419545/how-wi-fi-drains-your-cell-phone/> 2010.
Thiagarajan et al., "Accurate, low-energy trajectory mapping for mobile devices," in USENIX NSDI, 2011, 14 pages.
Varshaysky et al., "Gsm indoor localization," Pervasive Mobile Computing, Dec. 2007.
Wang et al., "No need to war-drive: Unsupervised indoor localization," In ACM MobiSys, 2012, 14 pages.
Wang et al., "Opportunistic energy-efficient contact probing in delay-tolerant applications," IEEE/ACM Transactions on Networking, 2009, 17:1592-1605.
Want et al., "The active badge location system," ACM Trans. Information Systems, 1992, 12 pages.
Wen et al., "On the Dynamic RSS Feedbacks of Indoor Fingerprinting Databases for Localization Reliability Improvement," Sensors, 2016, 16(8):1278, 15 pages.
Werb et al., "Designing a positioning systems for finding things and people indoors," IEEE Spectrum, 1998, pp. 71-78.
Wikipedia, "Disassembler," <https://en.wikipedia.org/wiki/Disassembler/> webpage available as early as Apr. 13, 2004.
Wikipedia, Assembly language <https://en.wikipedia.org/wiki/Assembly_language> webpage available as early as Mar. 3, 2004.
Woodman et al., "Pedestrian localisation for indoor environments," in ACM Ubicomp, 2008, 225 pages.
Wu et al., "Footprint: Cellular assisted WiFi ap discovery on mobile phones for energy saving," In WINTECH, 2009, pp. 67-75.
Xiong et al., "Secureangle: Improving wireless security using angle-of-arrival information (poster abstract)," In ACM SIGCOMM, 2010, 2 pages.
Xiong et al., "Arraytrack: A fine-grained indoor location system," in USENIX NSDI, 2013, 14 pages.
Xu et al., "Optimizing background email sync on smartphones," In Mobisys, 2013, 14 pages.
Yoon et al., "FM-based indoor localization via automatic fingerprint db construction and matching," in Mobisys, 2013, pp. 207-219.
Youssef et al., "The horus wlan location determination system," in ACM Mobisys, 2005, 14 pages.
Zavala et al., "Platys: From Position to Place-Oriented Mobile Computing," AI Magazine, 36(2), Jun. 2015, pp. 50-62.
Zhang et al., "E-MiLi: energy-minimizing idle listening in wireless networks," In ACM Mobicom, 2012, 11(9): 1441-1454.
Zhou et al., "Zifi: wireless lan discovery via zigbee interference signatures," In ACM Mobicom, 2010, 12 pages.

* cited by examiner

Algorithm 1: ATIS Signature Score Generation

1: INPUT: Signature database for locations visited by the user
2: INPUT: Set of currently observed BSs and their corresponding signal strengths at time $t$
3: OUTPUT: Estimated user location
4: Step 1. *For given input BS, identify the location cluster subset to reduce computation*
5: Step 2. *Calculate the score for the individual signatures*
6: for *radio type* do
7:    *for all signatures in cluster subset* do
8:       for *all Base Station IDs within signature* do
9:          if *Base Station ID exists in input at time(t)* then
10:             if *Requested signal strength bin is Empty* then
11:                Normalize 'x' adjacent bins
12:             end if
13:             Evaluate likelihood of occurrence using expectation maximization from Bayesian-based approach
14:          end if
15:       end for
16:       *Accumulate final likelihood scores for all signatures*
17:    end for
18: end for
19: Step 3. *Apply the lower and upper bound thresholds to generated scores (i.e., $C_L \leq score(i) \leq C_U$)*
20: Step 4. *Return estimated user location*
21: Step 5. *Check with the ground truth and update the signature thresholds if needed*

FIG. 3

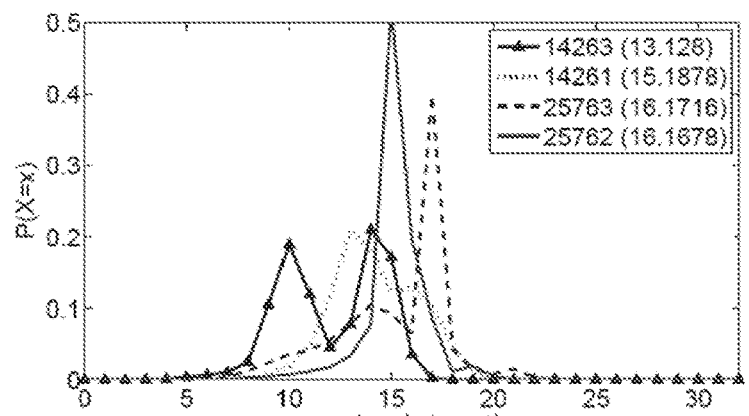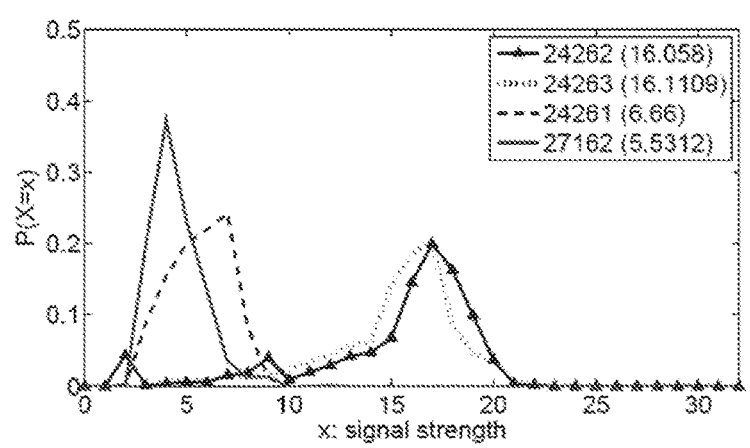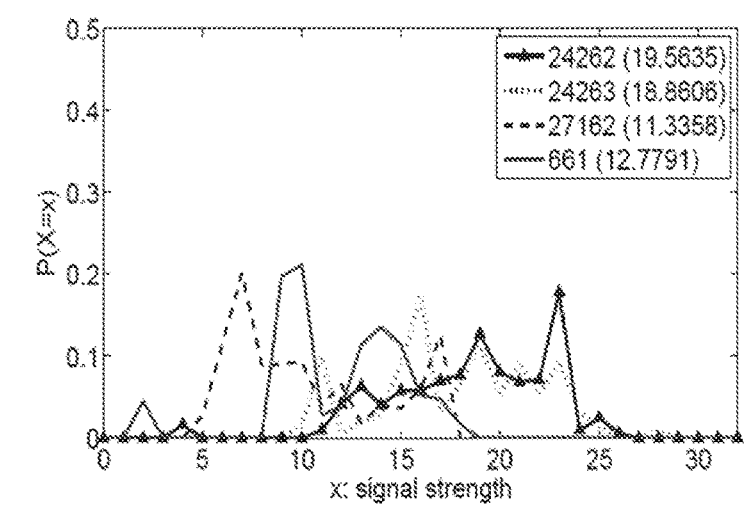
FIG. 8

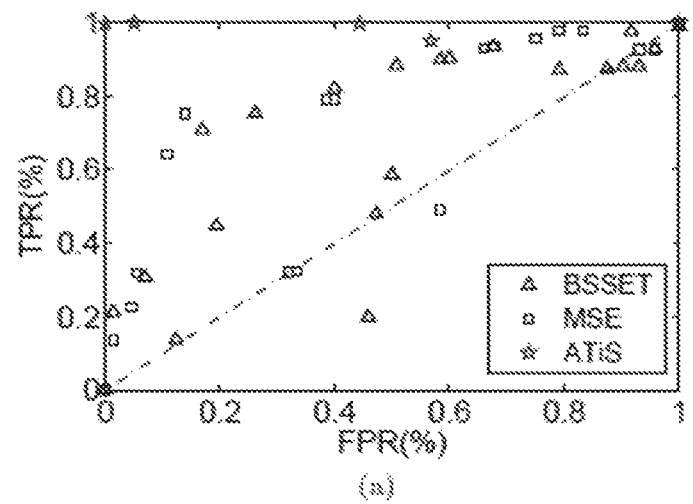
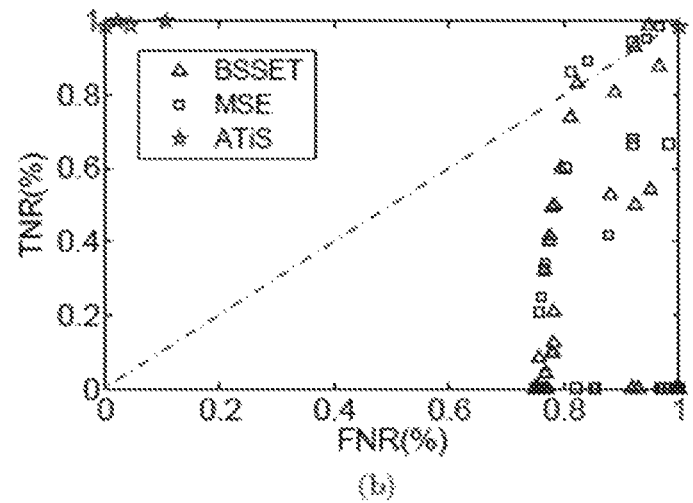
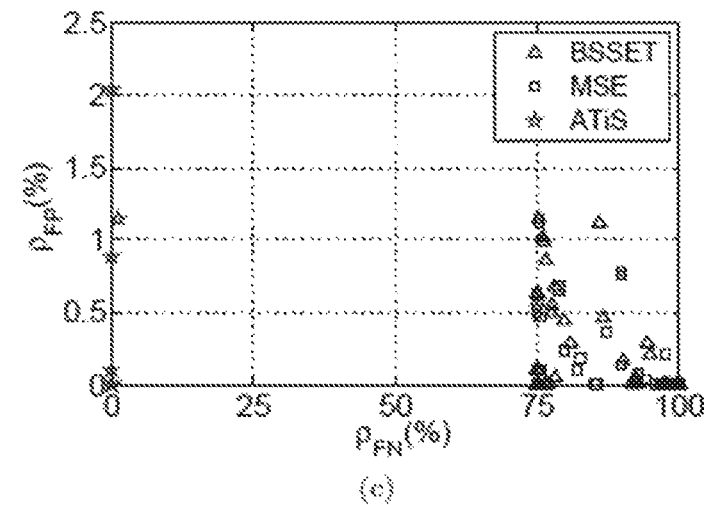
FIG. 12

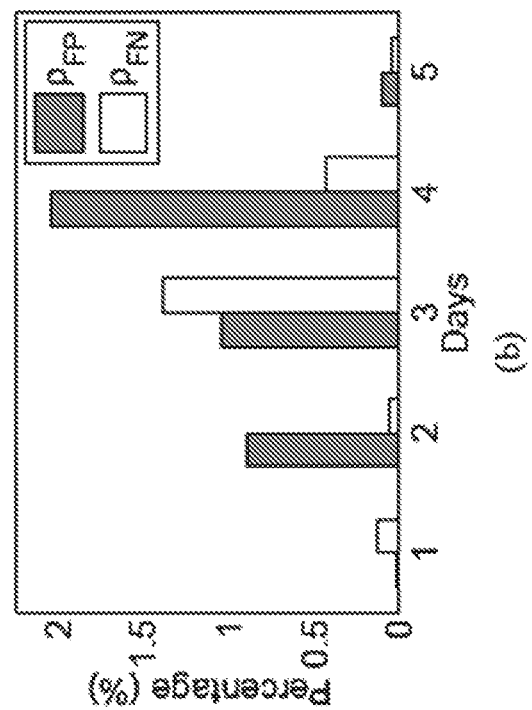
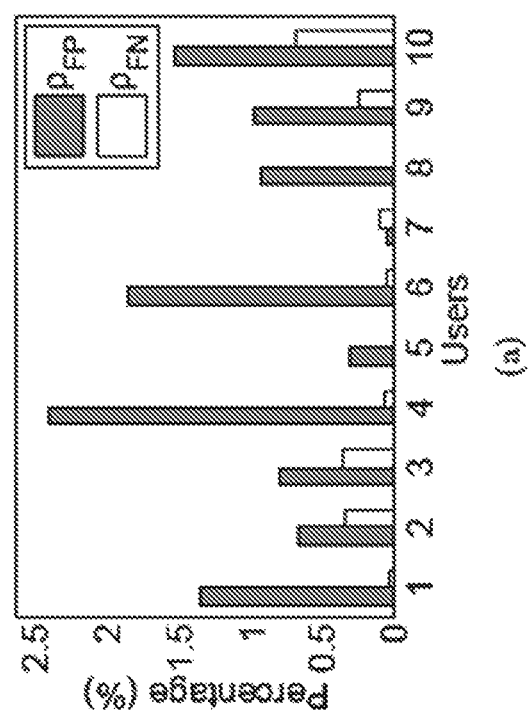
FIG. 13

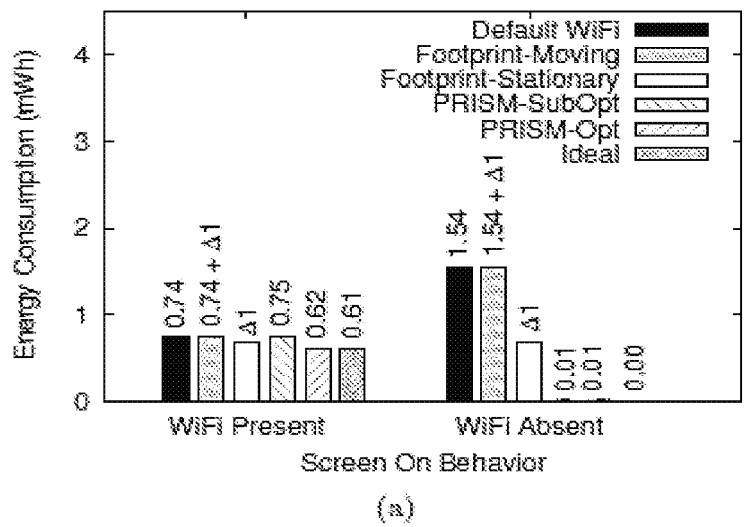
(a)
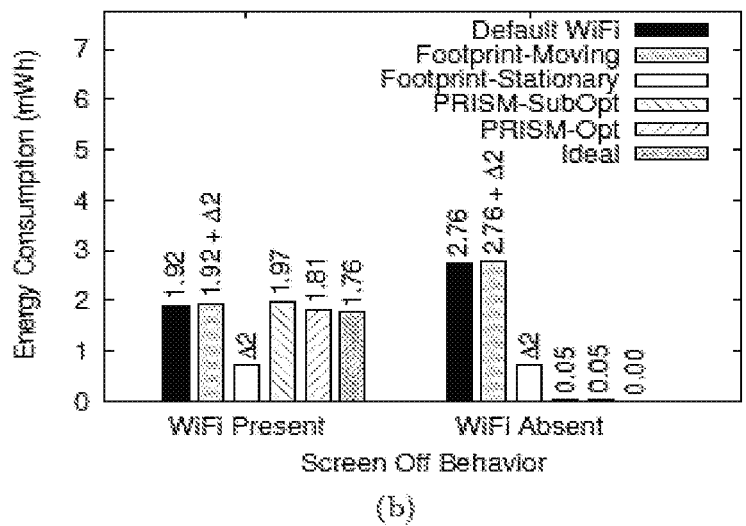
(b)
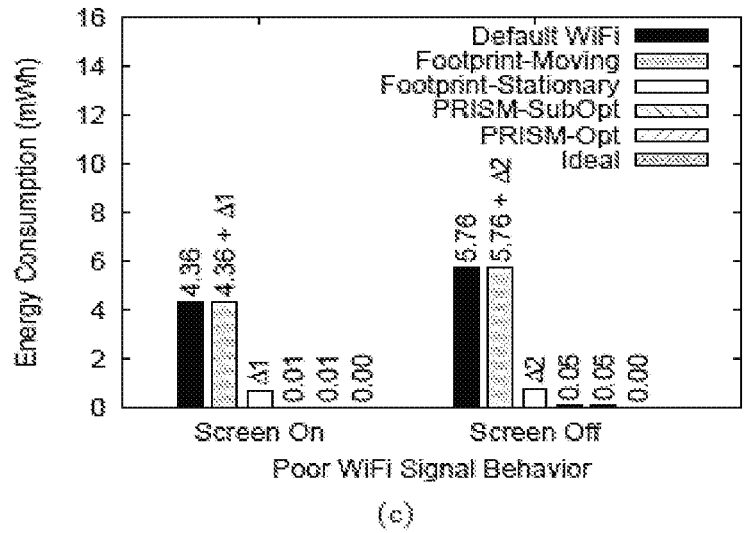
(c)
FIG. 14

```
<mac>
    <val>Location Name, Activity Information, RSSI Statistics</val>
    <radio>2G Radio Information</radio>
        <num># of unique 2G cellular BS observed in the location</num>
        <bs>BSID-1, Signal Strength Statistics </bs>
        <bs>BSID-2, Signal Strength Statistics </bs>
        ...
    <radio>3G Radio Information</radio>
    <radio>4G Radio Information</radio>
</mac>
```

FIG. 16

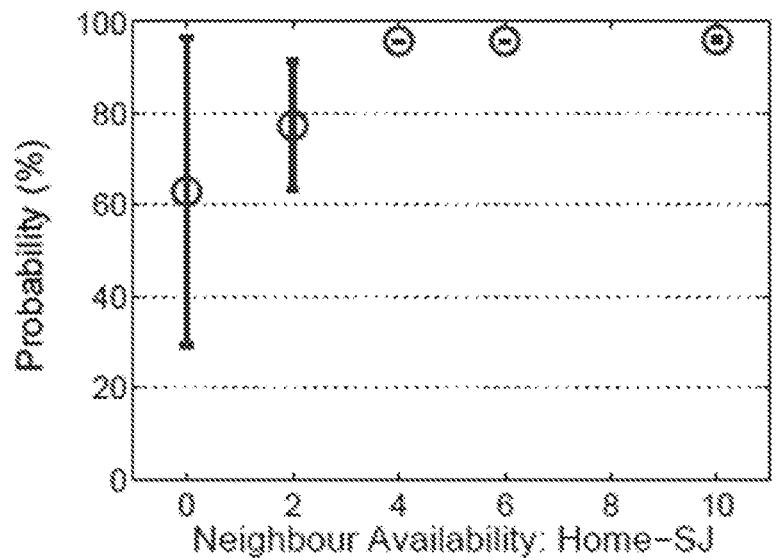
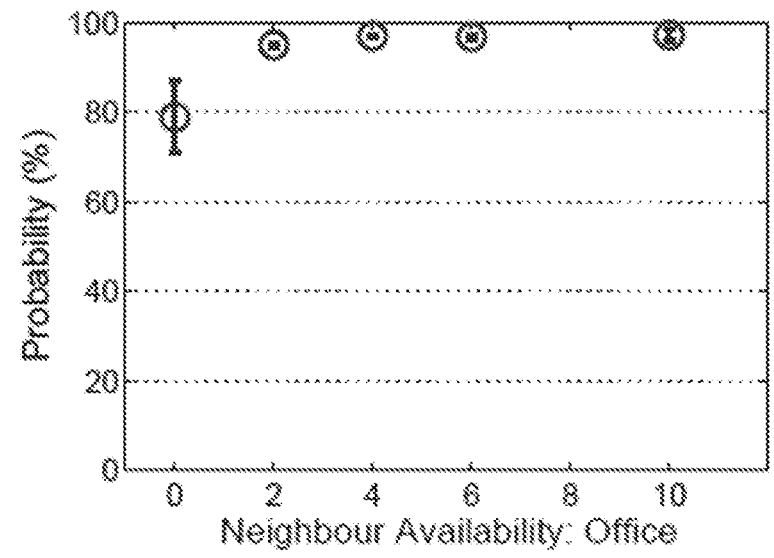
FIG. 26

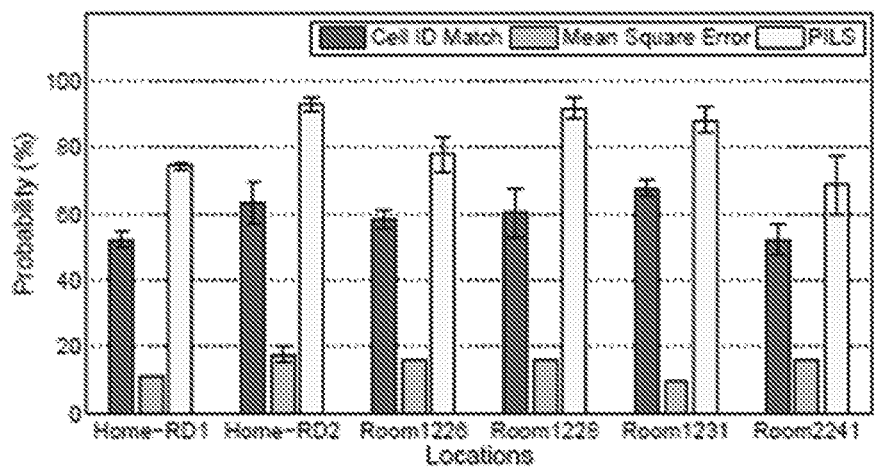
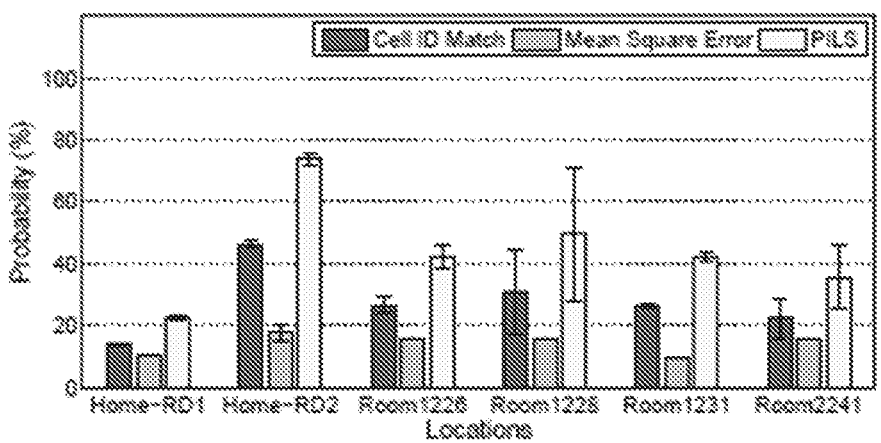
FIG. 29

SYSTEM AND METHOD TO DISCOVER DEVICE CONTEXT AND LOCATION USING CELLULAR SIGNAL INFORMATION

CROSS-REFERENCE TO RELATED APPLICATIONS

This patent application is the U.S. national stage entry, under 35 U.S.C. § 371, of international application number PCT/US2017/047222, filed Aug. 16, 2017, which claims priority to U.S. Provisional Application No. 62/376,234, filed Aug. 17, 2016, the entire contents of which are hereby incorporated by reference.

STATEMENT OF GOVERNMENT INTEREST

This invention was made with Government Support under Federal Grant No. 1016216 and Grant No. 0910868 awarded by the National Science Foundation. The Government has certain rights to this invention.

FIELD

Embodiments relate to systems and methods to discover context and location using cellular signal information.

BACKGROUND

The Internet of Things (IoT) paradigm aims to interconnect a variety of heterogeneous Smart Objects (e.g., sensors, smart devices, home automation equipment) using Machine-to-Machine communications. Smart mobile devices have become one of the primary ways for people to access entertainment and other business applications, both inside and outside of their homes. Location-based services are beginning to gain popularity with the increased use of smart mobile devices. Fast and energy-efficient indoor localization systems may require specialized hardware and RF signals or beacons to achieve accuracy and demand additional infrastructure and meticulous engineering for efficient working. Current indoor localization systems require extensive calibration and practical deployment overhead. Additionally, Wi-Fi signals used in these systems are more prone to multi-path and fading effects from static objects and human movement. Moreover, accelerometers inside smart mobile devices used to predict user location suffer from high battery energy consumption. An energy-efficient indoor localization system is desired.

SUMMARY

Methods and systems provided herein facilitate indoor localization using detailed statistical properties of cellular signals including both connected and neighbor base stations for GSM, UMTS, and LTE networks through cellular multi-homing. Also provided herein is a new context-aware indoor location detection system, PILS, which maps a context to a specific indoor location in a logical manner. In addition, a novel technique is described herein to dynamically build and update the signature clusters in near real-time and thus avoid the need for a specialized training phase. Methods and systems disclosed herein provide for a specialized non-parametric statistical matching algorithm which uses expectation maximization techniques based on Bayesian networks and automatically tunes the decision thresholds for every signature. We also implemented a rule-based decision engine to help facilitate sharing location information with any LBS applications.

Also developed is a new Wi-Fi detection system, PRiSM (Practical and Resource-aware Information Sensing Methodology), which utilizes the freely available cellular signal information of GSM signals to statistically map the Wi-Fi access points with a logical location information. A specialized statistical matching algorithm is also provided, which uses a likelihood estimation technique to automatically tune the decision thresholds for every signature. The threshold values can be tuned by connecting to access points and comparing against the ground truth values (i.e., access point available, unavailable) or by Machine Learning Techniques. In addition a novel selective-channel Wi-Fi scanning framework to automatically connect to the access points without scanning or association by utilizing their stored frequency channel information is provided. The empirically constructed signal distributions and decision thresholds for a Wi-Fi location are learned as time evolves.

Systems and methods provided herein address the following important challenges in ubiquitous and pervasive mobile computing maximal data offloading with minimal energy consumption, and context-aware indoor localization with minimal sensor costs. Proposed herein are systems namely PRiSM and PILS for the above challenges and prove the effectiveness of our solutions with working system prototypes.

In one embodiment, a method for determining a context associated with a communication device is provided. The method includes receiving a plurality of cellular signals; determining a plurality of context data including at least one of an action data and a location data; mapping the plurality of cellular signals to the plurality of context data; generating a plurality of context signatures based on the mapping of the plurality of cellular signals to the plurality of context data; storing the plurality of context signatures; and determining a context profile associated with the communication device at an instance using a probability distribution of the stored plurality of context signatures.

In yet another embodiment, a portable communication device to receive, via a communication interface, a plurality of cellular signals; determine a plurality of context data in the communication device, the context data including at least one of an action data and a location data; map the plurality of cellular signals to the plurality of context data; generate a plurality of context signatures based on the mapping of the plurality of cellular signals to the plurality of context data; store the plurality of context signatures; and determine a context profile associated with the communication device at an instance using a probability distribution of the stored plurality of context signatures.

Another embodiment provides a non-transitory computer-readable medium containing computer-executable instructions that when executed by one or more processors in a portable communication device cause the one or more processors to receive, via a communication interface in the portable communication device, a plurality of cellular signals; determine a plurality of context data in the communication device, the context data including at least one of an action data and a location data; map the plurality of cellular signals to the plurality of context data; generate a plurality of context signatures based on the mapping of the plurality of cellular signals to the plurality of context data; store the plurality of context signatures; and determine a context profile associated with the communication device at an instance using a probability distribution of the stored plurality of context signatures.

In one embodiment, a light-weight signature matching system to automatically discover Wi-Fi hotspots without turning on the Wi-Fi interface in the smart device. The system uses signal strengths received from cellular base stations to statistically predict the presence of Wi-Fi and connects directly to the hotspot without scanning. The system continuously learns based on user movement behaviors and auto-tunes its parameters accordingly. The system provides a practical and infrastructure-independent system to maximize Wi-Fi data offloading and simultaneously minimize Wi-Fi sensing costs.

In another embodiment, an indoor localization system is provided, which logically maps the contextual information of the smart device with a specific indoor location using cellular multi-homing. The indoor localization system is configured to use a variety of back-channel parameters such as Received Signal Code Power (RSCP) from 3G radio cellular systems, Reference Signal Received Power (RSRP) and Reference Signal Received Quality (RSRQ) from 4G radio cellular systems in addition to Received Signal Strength (RSS) values from 2G radio cellular systems. This system can also be extended to future generation of radio cellular systems using appropriate parameters defined for those generations. In some embodiments, the location accuracy may be controlled by using only connected base stations, with neighboring base stations, with self-sourced data and crowd-sourced data that is provided. In some embodiments, a combination of signals from different cellular radio technologies specific to different locations are provided to achieve better location accuracy in comparison to relying on one single radio technology for all indoor locations.

In another embodiment, statistical properties of cellular signals in indoor environments are analyzed to construct a reliable database of cellular signal signatures for different indoor locations. Systems and methods provided herein allows for accurately distinguishing between neighboring indoor locations in a reliable and energy-efficient manner. In some embodiments, the energy usage of Wi-Fi in mobile devices is profiled under different device screen activation scenarios and the energy wastage due to unnecessary scan and association events under poor link conditions is quantified.

BRIEF DESCRIPTION OF THE DRAWINGS

The accompanying figures together with the description below, are incorporated in and form part of the specification, and serve to further illustrate embodiments described herein, including various principles and advantages of those embodiments.

FIG. 3 illustrates an Automatically Tuned Location Sensing algorithm in accordance with some embodiments.

FIG. 8 illustrates the personalized signatures for three access points (a) $AP_X$, (b) $AP_Y$, and (c) $AP_Z$. The distance between $AP_X$ and $AP_Y$ is about 7 km, $AP_Y$ and $AP_Z$ is about 30 meters. $AP_Y$ and $AP_Z$ are located in the same building. The observed base station IDs and their average signal strengths are given in the legend.

FIG. 12 illustrates (a, b) ROC curves and (c) $_{PFP}$ Vs. $_{PFN}$ values for a randomly selected user for all algorithms in our test dataset 'D1'. ATiS achieves very high true positive and true negative values and very low $_{PFP}$ and $_{PFN}$ values simultaneously.

FIG. 13 illustrates (a) Average $_{PFP}$ and $_{PFN}$ for users in dataset 'D1' and (b) $_{PFP}$ and $_{PFN}$ for 5 consecutive days for a user.

FIG. 14 illustrates the Wi-Fi energy consumed every minute for (a) screen ON, (b) screen OFF, and (c) under poor Wi-Fi signals. For Footprint Δ1 is estimated to be 0.673 mWh for screen on and Δ2 is estimated to be 0.719 mWh for screen off conditions.

FIG. 16 shows a PILS signature element, in accordance with some embodiments.

FIG. 26 illustrates the prediction probability for change in number of observed neighbor Base Stations at test locations (a) Home-SJ (b) Office.

FIG. 29 illustrates the prediction probability for room level accuracy (a) All connected and neighbor base station (b) Connected BS only.

DETAILED DESCRIPTION

Figure 1:
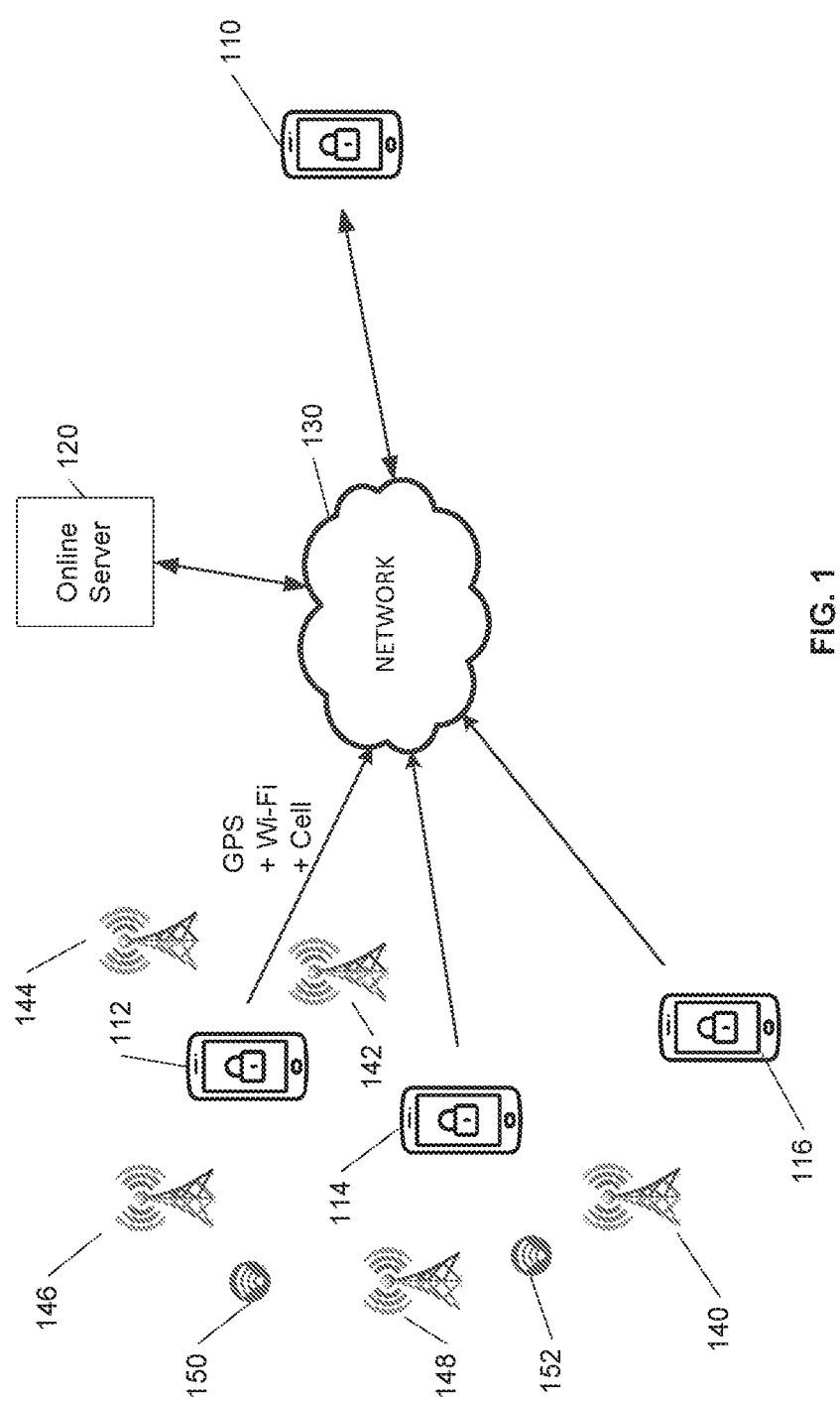
FIG. 1 illustrates a wireless communication data collection architecture, in accordance with some embodiments.

For the purposes of promoting and understanding of the principles of the present disclosure, reference will now be made to preferred embodiments and specific language will be used to describe the same. It will nevertheless be understood that no limitation of the scope of the disclosure is thereby intended, such alteration and further modifications of the disclosure as illustrated herein, being contemplated as would normally occur to one skilled in the art to which the disclosure relates.

Articles "a" and "an" are used herein to refer to one or to more than one (i.e. at least one) of the grammatical object of the article. By way of example, "an element" means at least one element and can include more than one element.

Unless otherwise defined, all technical terms used herein have the same meaning as commonly understood by one of ordinary skill in the art to which this disclosure belongs.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings, and may include electrical connections or couplings, whether direct or indirect. Also, electronic communications and notifications may be performed using any known means including direct connections, wireless connections, etc.

It should also be noted that a plurality of hardware and software based devices, as well as a plurality of different structural components may be utilized to implement the embodiments described herein. In addition, it should be understood that embodiments described herein may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, electronic based aspects of the invention may be implemented in software (e.g., stored on non-transitory computer-readable medium) executable by one or more processors. As such, it should be noted that a plurality of hardware and software based devices, as well as a plurality of different structural components may be utilized to implement embodiments of the invention. For example, "mobile device" and "computing device" as used in the specification may include one or more electronic processors, one or more memory modules including non-transitory computer-readable medium, one or more input/output interfaces, and various connections (e.g., a system bus) connecting the components.

Smart devices that provide health monitoring, smart home and workplace, enterprise device management, and many others need to constantly sense their context and communicate with the network to collaborate with others. Mobile applications that provide location-specific services require either the absolute or logical location of users in indoor settings. Identifying the context of a user (e.g., in front of the store, suits section, billing counter, home, office, conference room) in a timely and energy-efficient manner is important for the applications to disburse appropriate deals or activate a set of device-specific policies. In all these cases, though sub-meter level accuracy is not required or expected, a practical and an infrastructure-independent solution which can be easily deployed in real world is highly preferred.

Location-specific services are being used extensively from providing coupons and deals to setting site-specific security features in smart devices using Enterprise Device Management (EDM). For the above services, 'produce section', 'conference room' are few examples of logical locations. In these cases, though sub-meter level accuracy is not required or expected, accuracy of the order of few feet is highly preferred. However, to design a fast and an energy-efficient indoor localization system in an automated manner is (still) a very non-trivial task. Indoor localization systems may use specialized hardware and RF signals or beacons to achieve accuracy and demand additional infrastructure and meticulous engineering for efficient working. Some other localization systems may use Wi-Fi signal fingerprinting. However, these systems require extensive calibration and practical deployment overhead. Moreover, Wi-Fi signals are more prone to multi-path and fading effects from static objects and human movement. Sensors inside smart phones such as accelerometers are also be used to predict user location but they may suffer from high battery energy consumption. Some systems use 2G cellular signals for indoor localization but they only use averaged Received Signal Strengths (RSS) which is less granular since it contains power belonging to serving cells, co-channel cells, thermal noise etc. With the mobile carrier's planning to phase out outdated 2G systems by the end-of-year 2016 and the current advent of small cells and millimeter wave technologies, 4G cellular network characteristics may be used for energy-efficient and practical indoor localization.

FIG. 1 illustrates a wireless communication data collection architecture, in accordance with some embodiments. The architecture shown in FIG. 1 includes portable communication devices 110, 112, 114, and 116 in wireless communication with one or more cellular towers 140, 142, 144, 146, and 148. Also included in FIG. 1 is a server 120 that can be accessed by portable communication devices 110, 112, 114, and 116. The context information collected by these communication devices are passed on to the server 120 via the network 130. The server 120 then processes the data from multiple sources and generates a signature for a context which is downloadable to the communication device (for example, 110, 112, 114 and 116). The communication device when it associates the cell signature at any location at any time will predict the context associated with that location. The term "context" can be defined as a set of criteria or specification in relation to which measurements or judgments can be made. It can also hold a reference to the semantic meaning of the activity involved. The term "signature" can be defined as the signal or logical representation of the values observed by the communication device from any source.

Figure 2A:
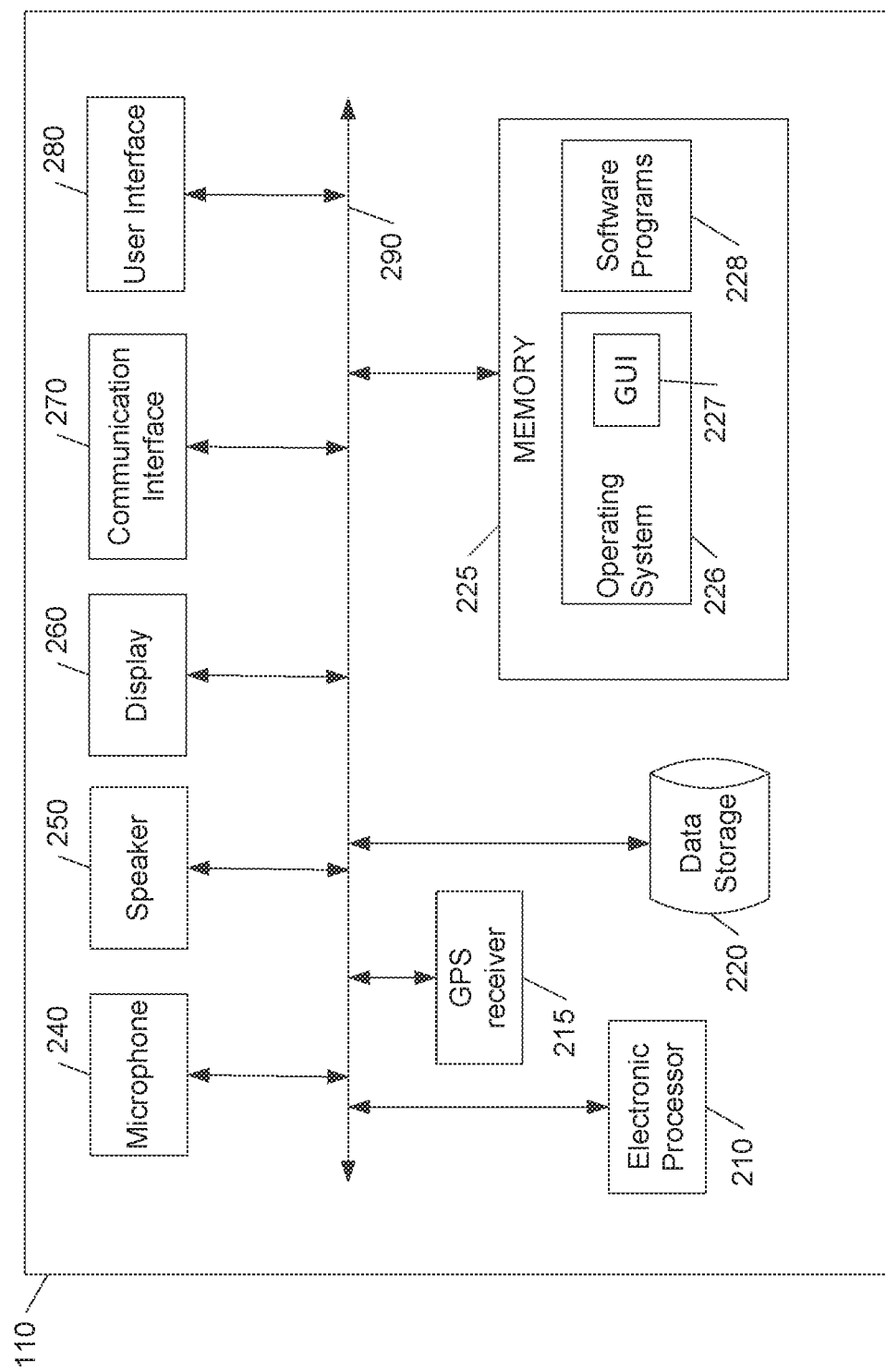
FIG. 2A illustrates a portable communication device shown in FIG. 1, in accordance with some embodiments.

FIG. 2A illustrates a portable communication device 110 shown in FIG. 1, in accordance with some embodiments. The portable communication device 110 may combine hardware, software, firmware, and system on-a-chip technology to implement the method of retrieving regulatory information as provided herein. In some embodiments, the portable communication device 110 includes an electronic processor 210, a position information device (for example a global positioning system ("GPS") receiver) 215, a data storage device 220, a memory 225, a microphone 240, a speaker 250, a display 260, a communication interface 270, a user interface 280 that can include a variety of components for example, an electronic mouse, a keyboard, a trackball, a stylus, a touch-pad, a touchscreen, a graphical user interface (GUI)) and others. The portable communication device 110 also includes a bus 290 that interconnects the components of the device. Some examples of the portable communication device 110 includes a smart phone, a tablet, a laptop, a wearable device, etc.

In the example illustrated the memory 225 includes an operating system 226 and one or more software programs 228. In some embodiments, the operating system 226 includes a graphical user interface (GUI) program or GUI generator 227 that provides a human-computer interface. The graphical user interface generator 227 may cause an interface to be displayed that includes icons, menus, text, and other visual indicators or graphical representations to display information and related user controls. In some embodiments, the graphical user interface generator 227 is configured to interact with a touchscreen to provide a touchscreen-based user interface. In one embodiment, the electronic processor 210 may include at least one microprocessor and be in communication with at least one microprocessor. The microprocessor interprets and executes a set of instructions stored in the memory 225. The one or more software programs 228 may be configured to implement the methods described herein. In some embodiments, the memory 225 includes, for example, random access memory (RAM), read-only memory (ROM), and combinations thereof. In some embodiments, the memory 225 has a distributed architecture, where various components are situated remotely from one another, but may be accessed by the electronic processor 210.

The GPS receiver 211 includes an antenna (not shown), which can be either internal or external to the portable communication device 110. Based on data received by the antenna from one or more satellites, the GPS receiver 211 provides positioning information to the electronic processor 210. The positioning information can include coordinates (for example, latitude and longitude coordinates), a speed, a heading, a time, and a quality value. In some embodiments, the GPS receiver 211 updates the positioning information at a predetermined frequency (for example, approximately once per second).

The data storage device 220 may include a non-transitory, machine-readable storage medium that stores, for example, one or more databases. In one example, the data storage device 220 also stores executable programs, for example, a set of instructions that when executed by one or more processors cause the one or more processors to perform the one or more methods describe herein. In one example, the data storage device 220 is located external to the computing device 110.

The communication interface 270 provides the portable communication device 110 a communication gateway with an external network (for example, a wireless network, the internet, etc.). The communication interface 270 may include, for example, an Ethernet card or adapter or a wireless local area network (WLAN) integrated circuit, card or adapter (for example, IEEE standard 802.11a/b/g/n). The communication interface 270 may include address, control, and/or data connections to enable appropriate communications with the external network.

The user interface 280 provides a mechanism for a user to interact with the portable communication device 110. As noted above, the user interface 280 includes input devices such as a keyboard, a mouse, a touch-pad device, and others. In some embodiments, the user interface 280 interacts with or is controlled by software programs including speech-to-text and text-to-speech converters. In some embodiments, the user interface 280 includes a command language interface, for example, a software-generated command language interface that includes elements configured to accept user inputs, for example, program-specific instructions or data. In some embodiments, the software-generated components of the user interface 280 includes menus that a user may use to choose particular commands from lists displayed on the display 260.

The bus 290, or other component interconnection, provides one or more communication links among the components of the portable communication device 110. The bus 290 may be, for example, one or more buses or other wired or wireless connections. The bus 290 may have additional elements, which are omitted for simplicity, such as controllers, buffers (for example, caches), drivers, repeaters, and receivers, or other similar components, to enable communications. The bus 290 may also include address, control, data connections, or a combination of the foregoing to enable appropriate communications among the aforementioned components.

In some embodiments, the electronic processor 210, the display 260, and the memory 230, or a combination thereof may be included in one or more separate devices. For example, in some embodiments, the display may be included in the portable communication device 110 (for example, a portable communication device such as a smart phone, tablet, etc.), which is configured to transmit an electronic message to the server 120 including the memory 225 and one or more other components illustrated in FIG. 1. In this configuration, the electronic processor 210 may be included in the portable communication device or another device that communicates with the server 120 over a wired or wireless network or connection.

Figure 2B:
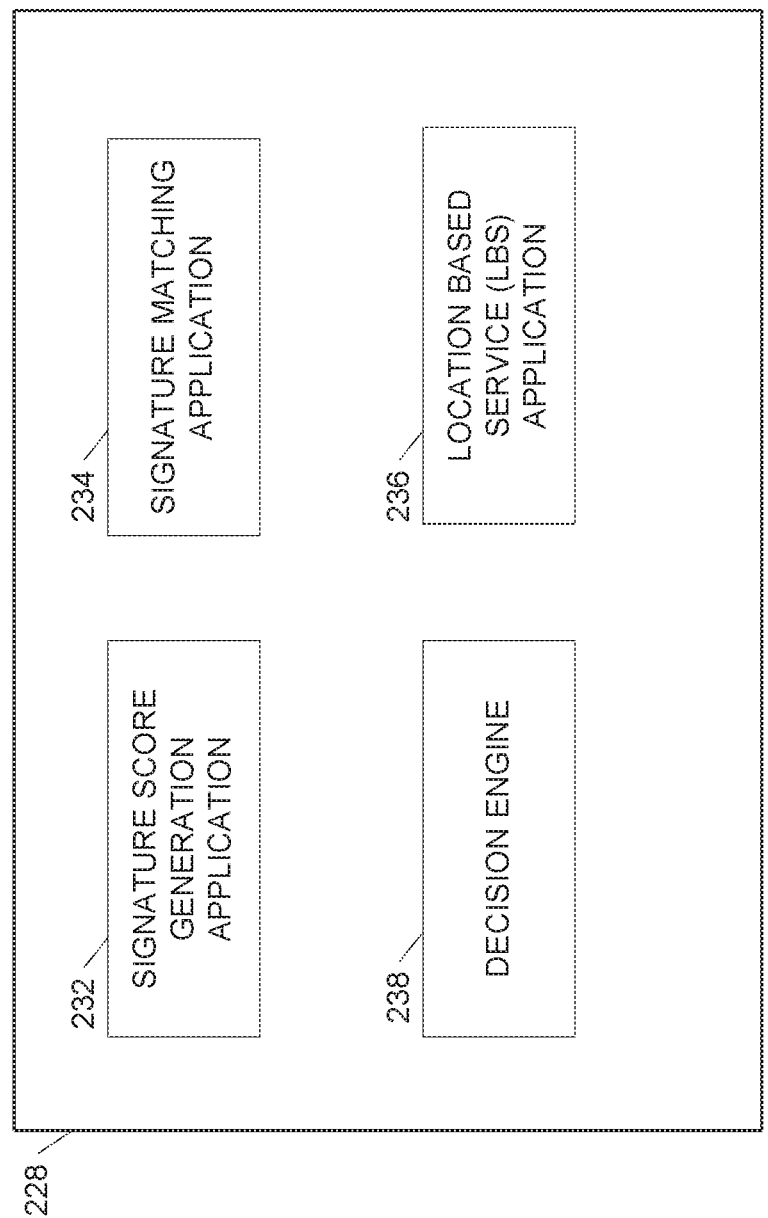
FIG. 2B is a block diagram illustrating the software programs shown in FIG. 2A, in accordance with some embodiments.

FIG. 2B is a block diagram illustrating the software programs 238 shown in FIG. 2A, in accordance with some embodiments. Software programs 238 includes a signature score generation application 232, a signature matching application 234, a location based service (LBS) application 236, and a decision engine 238. In one example, the signature score generation application 232 provides a process by which the signature is collected or accumulated in the server or on the communication device. In one example, the signature matching application 234 depicts the signature matching application which picks up or prepares instantaneous signals for matching with the pre-existing signature. In some embodiments, the decision engine 238 performs the algorithmic process to find out if the signals from the signature matching application 234 matches the signature built by the signature score generation application 232. The resulting decision is informed to any or all of the registered Location Based Service application 236.

Embodiments provided herein use the detailed statistical properties of physical (PHY) layer information of 4G Long-Term Evolution (LTE) networks for both connected and neighbor base stations. The Indoor Localization System provided herein, utilizes the freely available cellular signal information to statistically map the indoor locations in a logical manner. The location represents a 2 m×2 m spot within the indoor space. A location signature is defined as the set of probability density functions (PDFs) of signal strengths from all observable Base Stations (BS) when the device is present at that location. The Indoor Localization System runs in the background and reads cellular signals based on a scheduling policy and hence, consumes minimal energy overhead.

The Indoor Localization System dynamically builds and updates the signature clusters in near real-time and thus avoiding the need for an extensive training phase. The Indoor Localization System provides a specialized nonparametric statistical matching algorithm which uses expectation maximization techniques based on Bayesian networks to automatically tune the decision thresholds for every signature. The empirically constructed signal distributions and decision thresholds for a location can be adapted or learned as time evolves. The Indoor Localization System was implemented on Android smart phones and evaluated at over 60 different indoor locations. The percentage of times the Indoor Localization System predicted a correct location ranged up to 91%. The average localization error ranged less than 2.3 m when 4G LTE PHY layer information was used.

A. RSRP and RSRQ Parameters

Cellular signals are ubiquitous in nature and are received continuously by the phones. A smart phone can receive signals from more than ten base stations (BSs) in dense urban areas. Android phones can overhear signals from up to seven (six neighboring and one connected) BSs in ASU (Active Set Updates) units. The linear equation between dBm and ASU values for GSM networks is dBm=2ASU−113. In 4G LTE network system, in addition to observing the signal strength values, we also recorded the RSRP and RSRQ values. These parameters are described in the 3GPP standard specification. RSRP (Reference Signal Received Power) is a type of RSSI-based measurement. It measures average received power over cell-specific reference signals and hence, can provide better power information related to different locations unlike regular RSSI (Receive Strength Signal Indicator). RSSI values contain combined power belonging to serving cells, co-channel cells, thermal noise etc. RSRQ (Reference Signal Received Quality) is a parameter which provides the quality of received signals in the user device and is derived from RSRP and RSSI values. These parameters are used in cell handover process and hence, we believe using these back-channel parameters in addition to the regular signal strength values can substantially increase the localization accuracy.

B. Proposed Algorithm: ATiS (Automatically Tuned Location Sensing)

The algorithm that is provided herein utilizes detailed statistical properties of cellular signals instead of the averaged signal strength values. A simplified version of ATiS (Automatically Tuned Location Sensing) is explained in Algorithm 1 (FIG. 3). Since the entire signal distribution is available, ATiS predicts the location in near real-time. A higher level intuition of the algorithm is that if the probability of seeing a particular signal strength within the PDF of a base station (BS) is high and the probability of the BS observed at a particular location is high, the total joint distribution is maximized and we get a more accurate signature match. ATiS utilizes a set of signatures (P) each consisting of a set of base stations $R_j$ and corresponding signal strength distributions $f_{k,j}(S)$, where $k \in R_j$ and $j \in P$. Note that j and k are signature ID's (e.g., Location IDs) and cellular base station ID's respectively. Each signature P has information pertaining to the number of occurrences made by its individual base stations in n(k, j) and the total occurrences of all its base stations collectively in Nj. The maximum likelihood of the currently observed signals, $_{Sk}(t)$ for $t \in [t_1; t_2]$, from the base station k is calculated as v(k; j) for the signature j.

ATiS computes the likelihood scores using expectation maximization techniques based on the Bayesian Networks. For any input BS, it does a local normalization of signal strength values surrounding the target signal strength in the database and hence, performs well even under signal fluctuations. The closer the match of input BS within a signature, the better is the score for the location. All signatures whose likelihood scores satisfy the lower bound ($C_L$) and upper bound ($C_U$) thresholds are returned as output in descending order of their scores. The values of $[C_L; C_U]$ are initialized with [1; 0] initially. The upper bound gradually decreases and the lower bound gradually increases based on ground truth to achieve a tight threshold range. ATiS auto-tunes thresholds within 0-1 based on likelihood scores and hence, does not overfit the data for any particular scenario. PILS also uses a hashmap of unique location labels to store the signatures in a cluster and a reverse hashmap of observed BS IDs to labels. The signatures are thus computed only for the locations with current observed BS IDs. Hence, by design, PILS utilizes a cluster-reduction approach to only compare the currently received signals with a small subset of the signatures in the database irrespective of the total database size and saves on computation time to compare from all the signatures otherwise.

The primary modules of PILS include: Trainer Service, System Service, Signature Database and the Decision Engine (see FIG. 10). The trainer runs in the system background and constructs a list of unique signatures (inside the phone for privacy) for all locations visited by the user and is updated as time evolves. The system service overhears the cellular signals at requisite time intervals to predict the location. The decision engine ranks the scores from the Bayesian network based algorithm and outputs the result. Hence, PILS can be attributed to a middleware component providing location information to all system services running in the device. We implemented a prototype version of PILS in Samsung Galaxy S5 Android devices. The energy consumption for running PILS is compared to other approaches used for continuous location sensing in Table 1. The energy measurements are obtained from a power monitoring system (eg., Monsoon) and includes the energy for signal sampling, ATiS functioning and base CPU energy.

TABLE 1

Energy comparison per second between PILS and other approaches used for continuous location sensing.

| Item | Energy Consumed (mWh) |
|---|---|
| Wi-Fi Scan | 0.1185 |
| Accelerometer | 0.6670 |

TABLE 1-continued

Energy comparison per second between PILS and other approaches used for continuous location sensing.

| Item | Energy Consumed (mWh) |
|---|---|
| GPS | 1.5800 |
| PILS | 0.0173 |

Three Samsung Galaxy S5 phones running our customized application were used to gather data from around 60 different spots in two indoor locations: home and office. The layout of an office, in which the building measures 20 m×35 m and cross marks represent the test locations. Test locations (2 m×2 m) included both rooms separated by walls and open spaces. The wireless carrier used is AT&T© using 4G LTE-FDD (Frequency Division Duplex) spectrum technology. The training and test data are collected separately at different time intervals. A signature database is constructed using the training set and the test data is evaluated against the database. The average prediction accuracy values of ATiS algorithm is plotted for 2G and 4G radio network signals as shown in Table 2. For 4G radio, we include PHY layer measurements (RSRP, RSRQ) in addition to the regular RSS measurements. We define the prediction accuracy as the percentage of times, the algorithm correctly identifies the location as it's top choice. Since, ATiS works on expectation maximization, the results are ordered based on descending order of likelihood scores. Provided below are the observations made from the initial experiments.

TABLE 2

ATiS Average Prediction Accuracy (in %).

| cellular Radio | Location | |
|---|---|---|
| | Home | Office |
| 2G-RSS | 82.08 | 59.17 |
| 4G-RSS | 72.92 | 73.65 |
| 4G-RSRP | 84.58 | 76.56 |
| 4G-RSRQ | 75.83 | 67.08 |
| 2G + 4G-RSS | 91.25 | 81.04 |

A. Accuracy Varies with Number of Base Stations

The prediction accuracy should increase with increase in number of observed base stations. In some instances, locations with more BS matches obtained less likelihood scores (e.g., 0:1*0:1 is less than 0:1). Since ATiS tunes the thresholds for a location based on the collective score for all observed BS's and not on per-BS score, it resulted in these misclassifications. Also rooms had more stable signal distribution than large open indoor spaces which sometimes observed intermittent weak BS signals and hence, home location has better prediction accuracy than the office. The average localization error was found to range between 0.43 m and 2.29 m for home and office locations.

B. RSRP Values Provide Better Accuracy than RSS Values

RSS values contain average signal power including power belonging to serving cells, co-channel cells, and thermal noise and are more prone to environmental degradation. PHY layer RSRP values are measured over cell-specific reference signals and are less prone to local perturbations in the environment. Also, the RSS values from 4G networks yield better prediction than RSS signals from 2G networks in office location due to presence of small cells. In home location, the 4G towers were located far away than the 2G towers and hence, the RSS values were less helpful in differentiating the rooms.

C. RSRQ Values Provide Less Accuracy when Used Alone

RSRQ value is derived from RSRP and RSSI values. It is affected by adjacent channel interference and thermal noise and hence, when used alone, provides less accuracy than RSRP values. However, when RSRQ values are used alongside RSRP values, the prediction accuracy of the system is found to increase more than just using RSRP signals.

D. Radio Network Combinations Increase Accuracy

The prediction accuracy of the system increased up to 91% and 81% for home and office locations for 2G+4G-RSS radio combination. The radio signal distributions for BSs indifferent radio networks vary for different locations. Hence, a radio combination can help avoid mis-classification rather than relying on a single radio network where two adjacent indoor locations might observe similar signal distributions over time.

Localization Algorithms

In this work, we develop a novel and light-weight system, iSha, to insert specific log triggers in the executable code using an assembler/disassembler module called smali/backsmali. The system consists of three main processes: modifying the open source code of the internal phone component by the developer, modifying the runtime executable code inside the device dynamically using an assembler/disassembler module such as smali/backsmali, storing the energy measurement values and develop a energy model for future predictions. In these steps, it is assumed that the fine-grained energy measurements for individual sub-components in the phone or the device are available. The values can be published either by the manufacturer or a researcher who gets access to these measurement sheets or by way of manual measurement techniques.

Since most of the major modifiable components in these devices are open-source programs (e.g., wpa_supplicant for WiFi, bluetooth stack, NFC codebase), the developer alters the source code for a particular sub-routine to modify the functionality. During runtime, the assemble/disassembly takes places within the device and inserts log-triggers at specific places in the modified source code. By tracking the time information and the occurrence of log values, the system will automatically calculate the amount of energy consumed by a specific sub-module and displays it to the developer. In this way, it is possible for the developer to test the suitability of his code modifications in real world scenarios in addition to laboratory settings. Later, the measured detailed power consumption patterns of components under different device screen states are used to generate a model using stochastic approach. We also impart real-world data into the energy model for the developers to emulate "in-the-wild" variations from within their laboratory settings.

Fine-Grained Wi-Fi Energy Measurements

Figure 4:
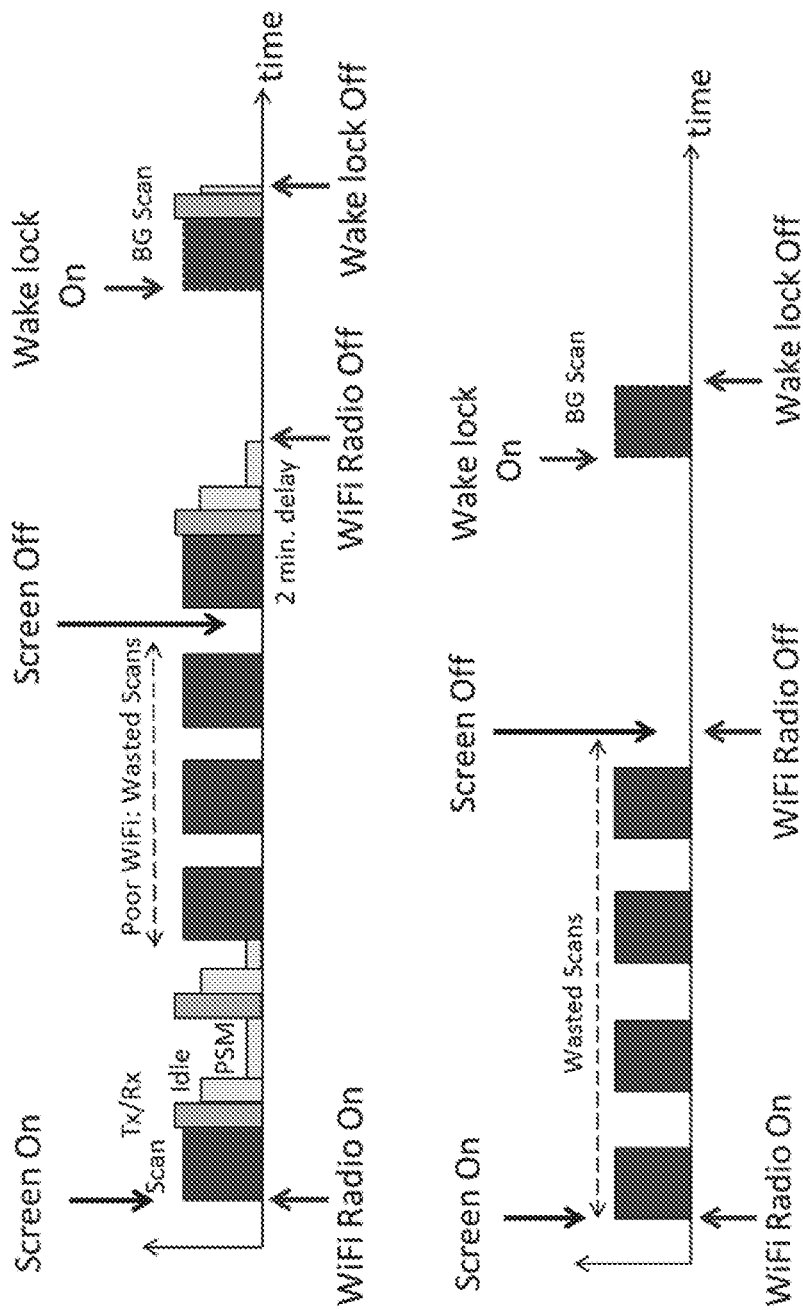
FIG. 4 illustrates working of default Wi-Fi when (a) an access point is available to connect with, and (b) when an access point is not available.
Figure 5:
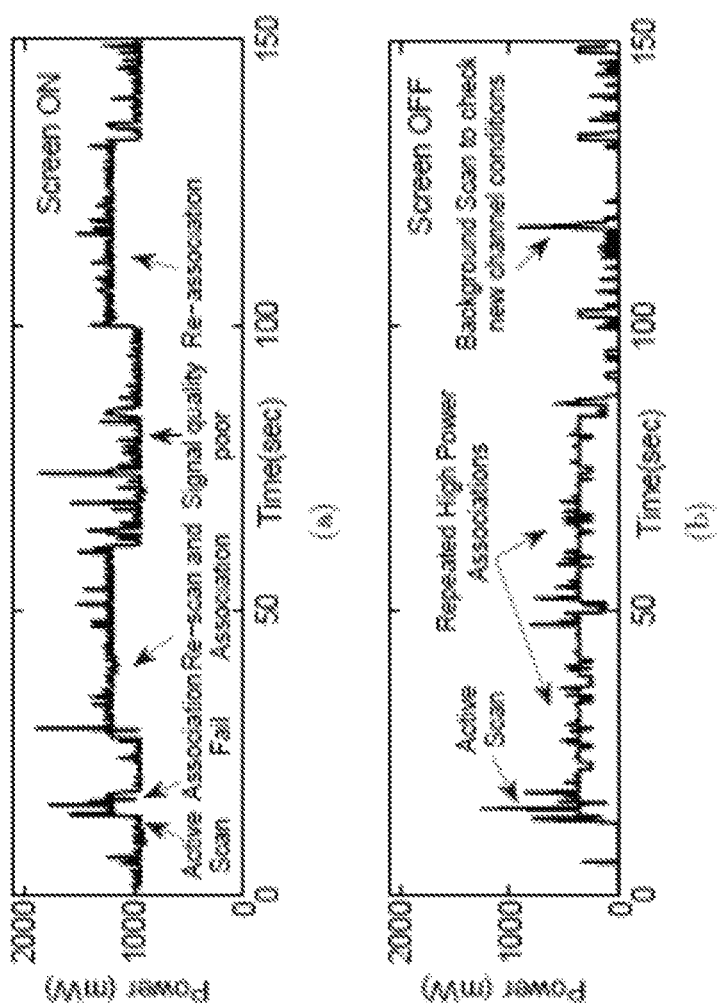
FIG. 5 illustrates the power consumption of repeated scan/association events under poor access point signal when the device screen is (a) On, (b) OFF.

In a smart phone, a Wi-Fi scan is initiated in response to two actions: by turning on the screen or when an application specifically requests for a scan. When an access point is available to connect, the Wi-Fi driver scans the available channels and connects to the pre-configured access point as shown in FIG. 4. If no such access point is found in the pre-configured list, it periodically scans until the device is successfully connected to an access point or until a connection time-out occurs in the Wi-Fi driver after 15 mins.

The default time interval for consecutive scans varies between 5-30 sec in various wpa_supplicant implementations. Upon screen off, the Wi-Fi radio chipset is turned off after a delay of 2 mins to avoid race conditions in the driver.

CPU Wake locks are obtained for operations during screen off. While in connected state, if the link quality deteriorates, the Wi-Fi radio driver is kept in high power state constantly due to repeated scan and association requests. Also to avoid packet loss, the driver operates at lower modulation rates. Our measurements using a power monitor show the repeated scan/association operations in FIG. 3. We start off by measuring the detailed power consumption patterns of Wi-Fi in mobile phones for different screen states (i.e., On, Off) under various Wi-Fi availability conditions (i.e., Good, Poor, Null) and data rates. The current power models do not consider such fine-grained variations; rather only consider the change in baseline power due to overall screen display brightness levels. Due to open source nature of Wi-Fi module (wpa_supplicant) in Nexus One phones, we added logs in appropriate places to correlate the energy consumption with the specific system process.

The energy consumed for some important processes during the Wi-Fi start-up is shown in Table 3. These measurements account for the specific processes alone and do not include the baseline system power. Hence, it captures all the dynamic power variations in the process including tail energy for the series of chipsets. Using iSha, there is no need for developers to use physical power monitoring devices and can dynamically deduce the change in power consumption measurements.

TABLE 3

FINE-GRAINED ENERGY MEASUREMENTS ON NEXUS ONE.

| Item | Energy (μWh) | |
|---|---|---|
| | Screen On | Screen Off |
| Radio Up | 79.90 | 100.10 |
| Scan | 83.40 | 118.50 |
| Association | 77.10 | 108.00 |
| DHCP | 28.90 | 53.90 |
| Radio Down | 39.70 | 59.40 |

Procedure to Compile Platform Source Code

In order to modify the Wi-Fi sub-component and replace the binary, the modified source code should be compiled within the entire platform source code for Android. In the section, we provide details to compile the platform source code of Android as follows. Some of the details for new Android OS releases may be different than that provided below.

Set up Build Environment. Get Python installed.
Install JDK 6 if you want to use Gingerbread or newer
sudo add-apt-repository "deb http://archive:canonical.com/lucidpartner"
sudo add-apt-repository "deb-src http://archive:canonical.com/ubuntulucidpartner"
sudo apt-get update
sudo apt-get install sun-java6-jdk
   Install all other required packages
   In this explanation, Linux version is Ubuntu 11.04. All following commands for ADB setup is for this version. For other lower versions, it may change. Test device is HTC Nexus One (Passion) running Linux kernel 2.6.32.x
   Get USB access to Linux System for using ADB (Android Debug Interface).
   Download Android source from git
Make sure you have a bin/directory in your home directory, and that it is included in your path.
mkdir/bin
PATH/bin:$PATH
Download the Repo script and ensure it is executable.
curl https://android.git.kernel:org/repo>/bin/repo
chmod a+x/bin/repo
After installing Repo, set up your client to access the android source repository. Create an empty directory to hold your working files.
mkdir WORKING_DIRECTORY
cd WORKING_DIRECTORY
Run repo init to bring down the latest version of Repo with all its most recent bug fixes. You must specify a URL for the manifest, which specifies where the various repositories included in the Android source will be placed within your working directory.
repo init-u git://android.git.kernel.org/platform/manifest.git
To pull down files to your working directory from the repositories as specified in the default manifest, run repo sync.
To compile the code after setting up all the environments including adb in your virtual machine, run the following in order.
Run Nexus one script. Your phone should be connected with the virtual machine.
cd WORKING_DIRECTORY
cd./device/htc/passion/
./extract-files.sh
build the setting
cd WORKING_DIRECTORY
repo sync_j16
build/envsetup.sh
lunch full_passion_userdebug
To enable Debug Logs printed in wpa, change the log level to MSG_DEBUG from MSG_INFO at line 23 of the file wpa_ebug.c
Now build it at WORKING DIR. It takes around 2 hrs for initial build.
cd WORKING_DIRECTORY
make_j16
The wpa_supplicant binary can be found under/out/target product passion/system/bin/
Procedure to Replace Supplicant Binary
Changes to sub-modular functions were made such as scanning, authentication, association etc and it was found that the final energy consumption values obtained using iSha remained within 2% of the actual power monitor. The prototype implementation is performed in HTC Nexus One phones since the Wi-Fi functionality is open-sourced and is easily available without any additional OEM modification. The steps are given below:
Copy the wpa_supplicant binary file to SDCARD
In the HTC Nexus One phone, in "wireless and networks" menu, disable WiFi by unchecking the checkbox
Make sure you have rooted the phone and have given it "super-user" access
Open a command window from within the "platform-tools" directory in your device
Type the following commands in order
adb shell
su
mount-o rw, remount-t yaf fs2/dev/block/mtdblock3/system
chmod 777/system/bin
cat/sdcard/wpa supplicant_nithy>/system/bin/wpa_supplicant Collecting the logs on Android phone without USB cable normally is achieved via following commands adb wait-for-device shell
logcat-v threadtime>/data/logcat.log &

The power values and timing measurements of logs from the wpa_supplicant can be obtained using advanced commands such as below logcat-v threadtime power:I wpa_supplicant:I WifiStatetracker:D>/data/logcat_nithy.log
logcat-v time power:I wpa supplicant:I WifiStatetracker: D>/data/logcat_nithy.log The Wi-Fi usage patterns from different devices are logged on to a centralized database and we build an effective energy consumption model suitable for most devices based on logged process events. The developers can later obtain logs from a variety of users with various mobility and usage patterns and apply the energy model to evaluate the energy efficiency of their methodologies at various instances and can also emulate "in-the-wild" variations from within the laboratory settings.

Wi-Fi Hotspot Auto-Discovery System for Smart Objects

A Wi-Fi detection system, PRiSM (Practical and Resource-aware Information Sensing Methodology), which utilizes the freely available cellular signal information of GSM signals to statistically map the Wi-Fi access points with a logical location information is also provided.

Prior works with Wi-Fi detection mechanisms used optimal scanning intervals for Wi-Fi to identify hotspots. The scanning intervals are increased or decreased based on parameters like access point inter-arrival time, access point density and user velocity. Since the Wi-Fi connectivity times and movement patterns vary among users, these methods do not adapt well for all users. Wi-Fi signal fingerprinting techniques use extensive offline pre-processing stage to construct signal strength models and to calibrate the radio maps. Also, the techniques take more time to converge.

Multi-modal sensing techniques (e.g., Accelerometers, GPS, Bluetooth, Zigbee) are also developed to identify context. Few others use average received signal strengths from connected cellular base stations to predict user location. However, averaging the signal strength values results in loss of granularity and use of additional sensors consume significant extra battery energy (e.g., Accelerometers consume close to 0:667 mWh every 30 sec). Some require infrastructural changes and extensive war-driving efforts to obtain feature-rich data sets. Also, most commercial systems (e.g., WiFi Sense, Place Lab) turn on the radio interfaces continuously to identify context which results in excessive battery drain where Wi-Fi scan/association is observed to have high initial costs.

Wi-Fi Power Consumption

In a smart phone, a Wi-Fi scan is initiated in response to two actions: by turning on the screen or when an application specifically requests for a scan. When an access point is available to connect, the Wi-Fi driver scans the available channels and connects to the pre-configured access point as shown in FIG. 4. If no such access point is found in the pre-configured list, it periodically scans until the device is successfully connected to an access point or until a connection time-out occurs in the Wi-Fi driver after 15 mins.

Figure 7:
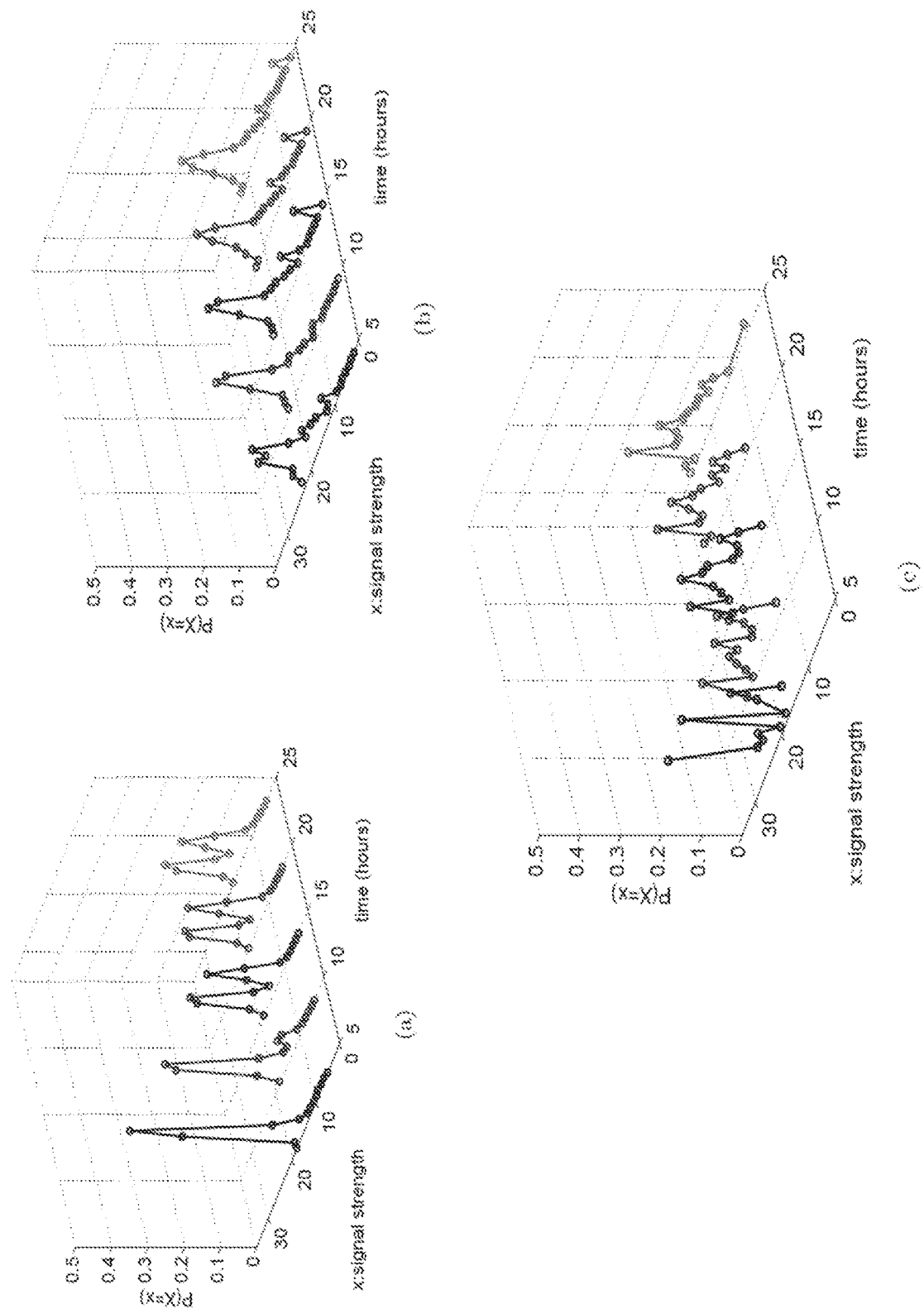
FIG. 7 illustrates the evolution of signal strength distributions from the most frequently connected base station for 3 different Access Points (AP) are depicted in (a), (b), and (c). For each access point, the data is aggregated over time whenever connected with the AP.

The default time interval for consecutive scans vary between 5-30 sec in various wpa_supplicant implementations. Upon screen off, the Wi-Fi radio chipset is turned off after a delay of 2 mins to avoid race conditions in the driver. CPU Wake locks are obtained for operations during screen off. While in connected state, if the link quality deteriorates, the Wi-Fi radio driver is kept in high power state constantly due to repeated scan and association requests. Also to avoid packet loss, the driver operates at lower modulation rates. FIG. 7 illustrates measurements using a power monitor showing the repeated scan/association operations in.

Figure 6:
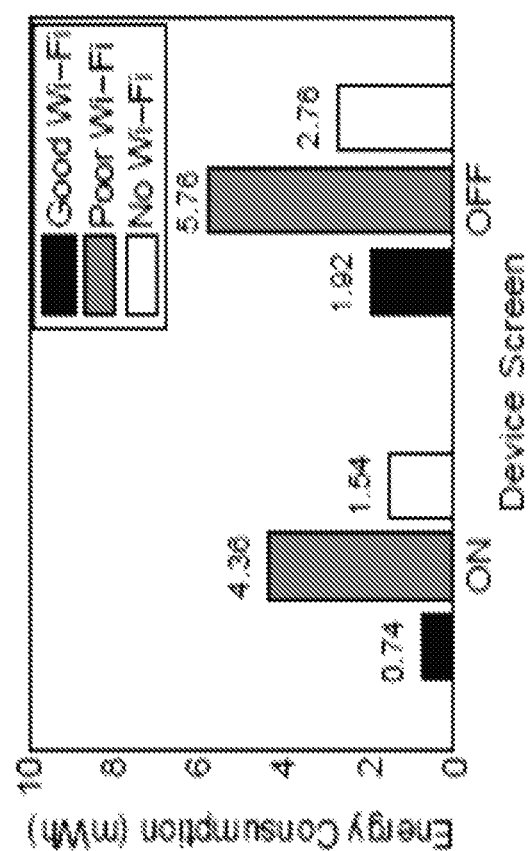
FIG. 6 illustrates default Wi-Fi energy consumption for one minute under various screen activation conditions.

When there is no access point available to connect, the Wi-Fi radio driver scans continuously and results in energy wastage (FIG. 7 (*b*)). The energy consumed by the Wi-Fi radio under various screen conditions and access point availability conditions is shown in FIG. 6. Thus, PRiSM can save substantial energy by intelligently avoiding poor and no Wi-Fi conditions in an accurate manner.

Cellular Signatures

The feasibility of constructing a database using the statistical information of cellular signals for each Wi-Fi access point and the ability to distinctly identify the access points in the database based on their signatures was also investigated. Cellular signals are ubiquitous in nature and are received continuously by the phones. A smart phone can receive signals from more than ten base stations (BSs) in dense urban areas. GSM based Android phones can overhear signals from up to seven (six neighboring and one connected) BSs in ASU (Active Set Updates) units at any time instant. The linear equation between dBm and ASU values for GSM networks is dBm 2ASU-113. ASU values range from 0 to 31 and 99, which indicates unknown signal strength. The total time interval of observation of every base station within the signature differs and depends both on the total time spent by the user while connected to the particular Wi-Fi and also on the occurrence pattern of the base station.

Figure 19:
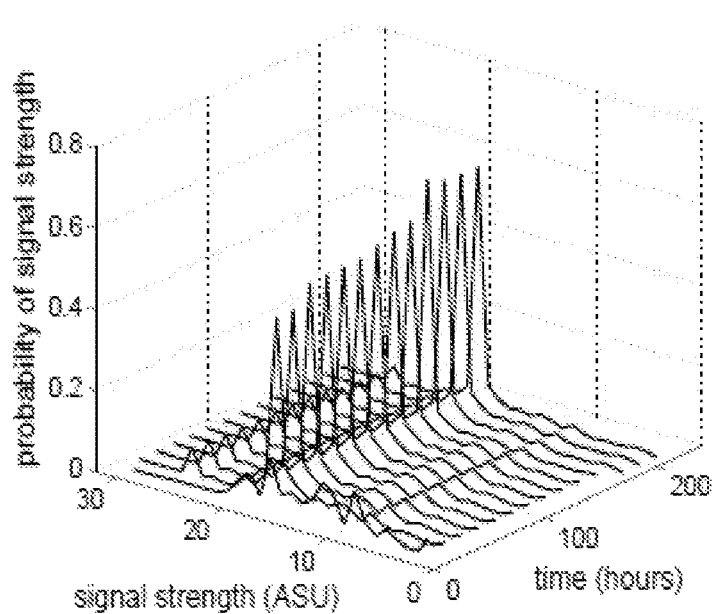
FIG. 19 illustrates the evolution of cellular signatures at a location.
Figure 20:
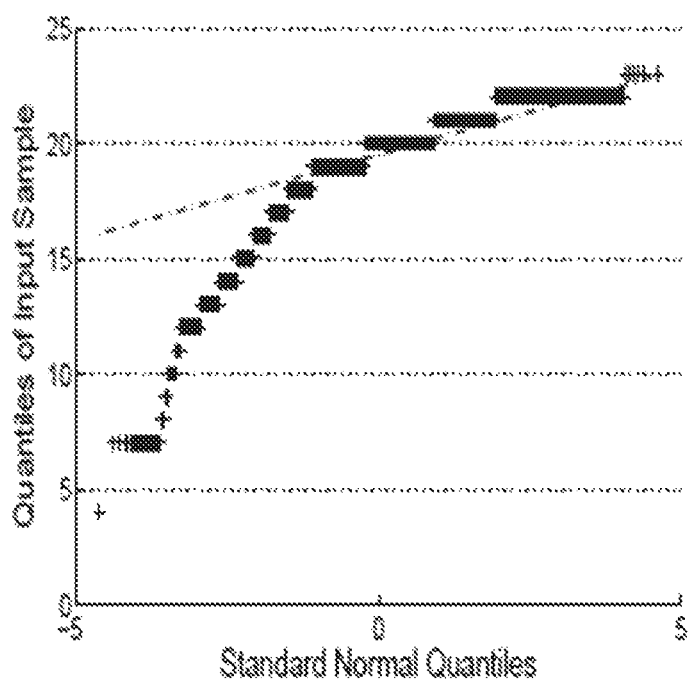
FIG. 20 shows a Q-Q Plot of sample data Vs. Standard Normal values

To capture the entire signal characteristics that a user uniquely experiences for an access point, we propose to build cellular signal signatures using "probability distributions" of signal strengths from all observable connected and neighbor base stations rather than using abstracted information (e.g., "average signal strengths"). A Wi-Fi signature is defined as the set of probability density functions (PDFs) of signal strengths from all connected and neighbor Base Stations (BS) when the smart phone is associated with that unique Wi-Fi access point. We performed the statistical measurements for all users in our dataset, but for explanation purposes, we will take random users to show the following results. FIG. 19 shows the evolution of signatures recorded by a user over time for three Wi-Fi access points to which the user has connected most frequently. For better readability, we plotted only the signal strength distribution from the most frequently connected BS per Wi-Fi access point. The figure shows the PDF of signal strengths received from the connected BS at different intervals of time. Simply put, the distribution shown after 10 hours includes the data used for the distribution shown at 5 hours plus five more hours. Note that the signal strength distributions do not converge to a Gaussian distribution even after 25 hours of signal accumulation. Hence, we develop a non-parametric algorithm which does not assume anything about the underlying data distribution. The correlation coefficient ($PX_1, X_2$) between probability distributions accumulating signals for different amounts of time clarifies the existence of characteristic patterns in the signatures. High value of correlation coefficients for signatures after 25 hours of signal accumulation and low cross-correlation values indicate that our statistical technique is likely to provide good performance in matching accuracy.

FIG. 8 further shows that the signatures recorded by a user for different access points located far from or near to each other have significant dissimilarities. We again choose three Wi-Fi APs: $AP_X$, $AP_Y$, and $AP_Z$ from a user's database, where distances between $AP_X$ and $AP_Y$ is about 7 km and between $AP_Y$ and $AP_Z$ is about 30 meters ($AP_Y$ and $AP_Z$ are in the same building). In the figures, base station IDs and their average signal strengths are given in the legend. As expected, the signatures for $AP_X$ and $AP_Y$ contain completely different sets of BSs and different patterns of signal distributions. On the other hand, the signatures for $AP_Y$ and $AP_Z$ show similar sets of BSs. However, they are still distinguishable because the signal distributions show unique patterns. Considering the possible differences in the environment and the behavior of a user, observing dissimilar signal distributions even for nearby access points is not surprising and actually helps to identify the access points more reliably.

Existing Localization Algorithms

A class of algorithms (referred as BSSET) uses the set of cellular BS ID's to evaluate the likelihood of matching a fingerprint in the database. It can simply count the number of common BSs or can sum up the weight values of common BSs, where the weight is assigned to each BS based on its frequency of observation. Another set of algorithms (referred as MSE) use mean squared error for matching. An error is defined as the difference between the signal strength in current observation and the average signal strength recorded in the fingerprint for the same BS.

Most Artificial Intelligence (AI) techniques typically identify the top k fingerprints showing the smallest MSE values and then calculate the center from the locations paired with k fingerprints. This extension is called kNN (k-nearest neighbor) but they have the following problems: minimal training phase but costly testing phase including both time and memory, and assume that data is in feature/metric space which means it is associated with some distance. PRiSM requires entire signal distribution clusters of the training data for quicker prediction and hence, uses a specialized hybrid algorithm which includes lazy learning techniques and statistical likelihood estimation. Both BSSET and MSE algorithms need their own hard-coded threshold value (C) but PRiSM auto-tunes its threshold parameters regularly. Some others use a model-based approach to build radio signal maps. They take more time to converge and require extensive war-driving to generate the data set. PRiSM does not assume anything about the underlying data model or distribution and hence takes a non-parametric approach.

Architecture

Figure 10:
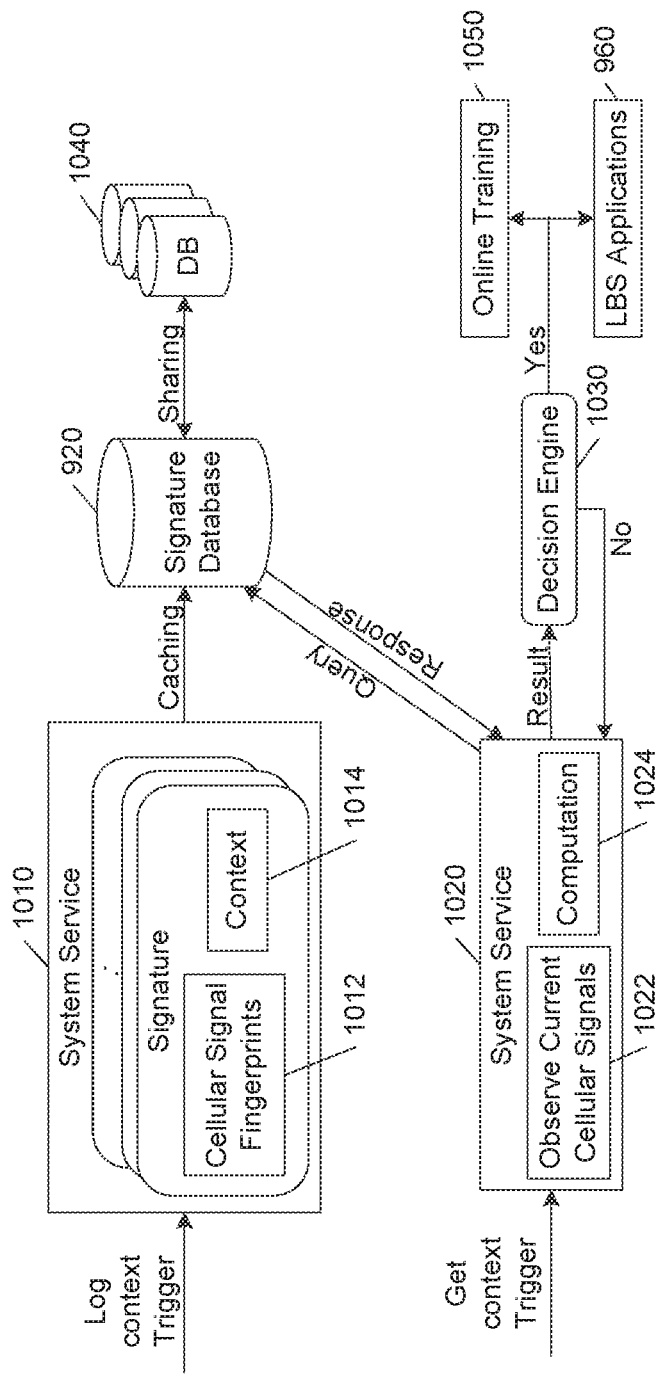
FIG. 10 shows a practical indoor location system (PILS) architecture in accordance to some embodiments.
Figure 11:
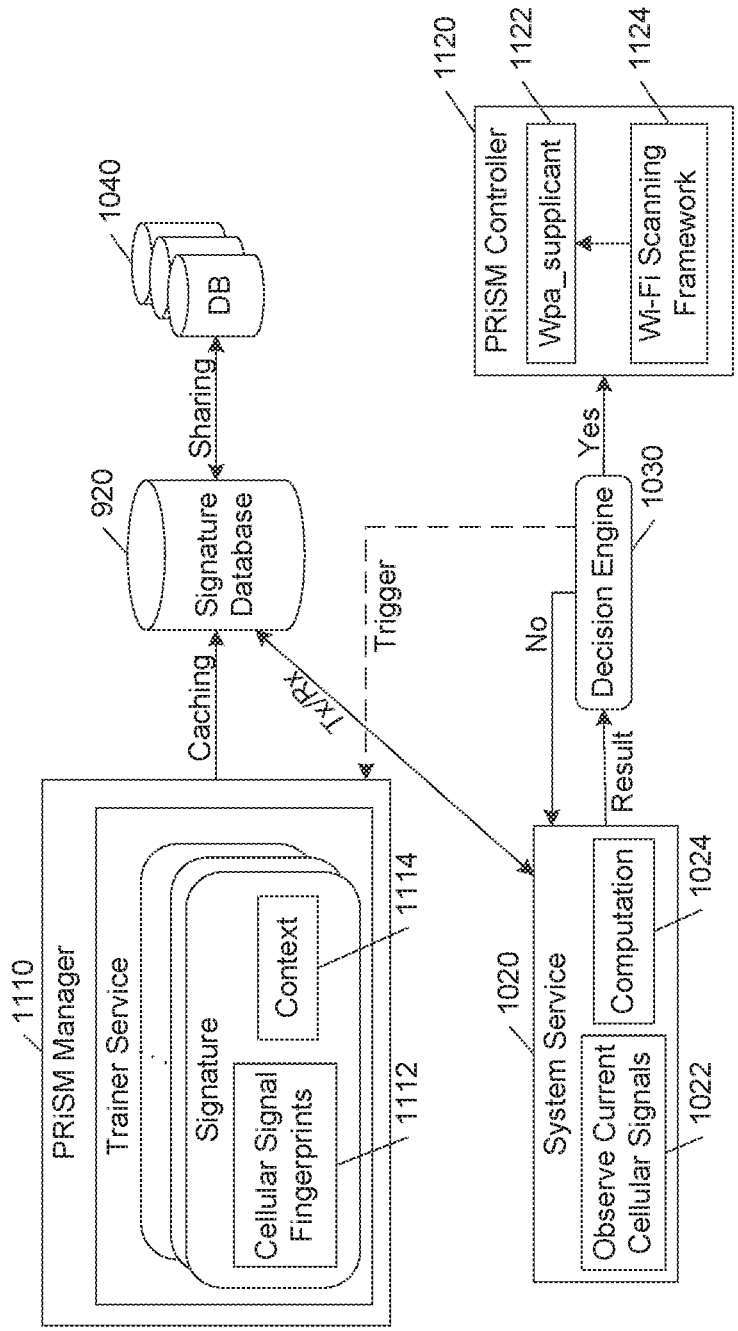
FIG. 11 illustrates various operations included in the PRiSM system shown in FIG. 9 in accordance to some embodiments.

The primary modules of PRiSM as shown in Figure FIG. 10 include: PRiSM Manager at the application layer and PRiSM Controller at the platform layer of the Android stack. The manager runs in the system background and builds a list of unique signatures (inside the phone for privacy) for all connected Wi-Fi access points through the trainer service. The sensing service overhears the cellular signals at programmed time intervals to predict access point availability. The decision engine ranks the scores from the Bayesian network based algorithm and outputs the result. The controller implements a novel selective-channel Wi-Fi scanning framework to connect to access points directly without scanning or association via wpa_supplicant module in the phone system. It uses appropriate frequency channel information of access points stored in the database. The existing configuration file wpa_supplicant.conf is intelligently modified at runtime to provide access to the manager and the controller simultaneously. Hence, PRiSM can serve as a middleware for all Location Based Service (LBS) applications in the smart phone. PRiSM suppresses Wi-Fi connection to an access point in poor signal strength regions and when the user moves closer to the same access point, it automatically matches the good signature of the access point and connects to it.

Operation

Figure 9:
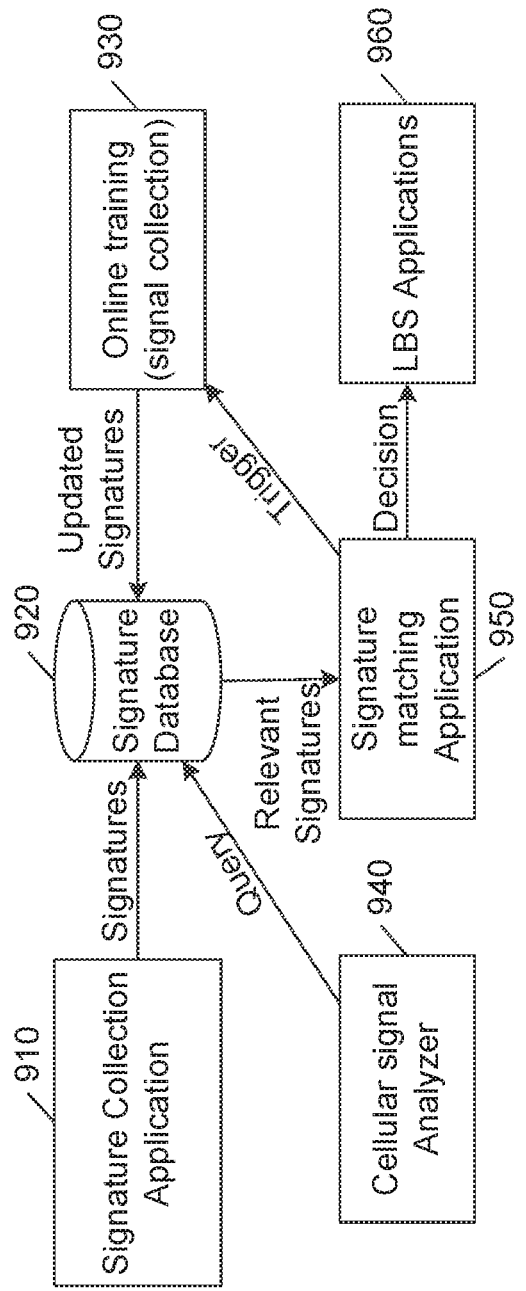
FIG. 9 illustrates a Practical and Resource aware Information Sensing Methodology (PRiSM) system, in accordance to some embodiments.

FIG. 9 illustrates a Practical and Resource aware Information Sensing Methodology (PRiSM) system, in accordance to some embodiments. The PRiSM system shown in FIG. 9 includes a signature collection application 910, a signature database 920, an online training module 930, a cellular signal analyzer 940, a signature matching application 950, and LBS applications 960. The three important tasks performed by PRiSM is shown in FIG. 9 and they include: bootstrapping, signature matching, and online training. Bootstrapping is the first process when a signature database is created for every user for the first time. Here, an event represents the process of connecting to a Wi-Fi access point. Since most people show regular movement patterns on a weekly basis, the signatures are continuously updated as time evolves but most signatures get stabilized quickly within a week. The process of computing the likelihood score for an access point from all matching signatures and threshold parameters is called as Signature Matching. The decision engine notifies the Wi-Fi on/off decision along with the access point channel information to the Wi-Fi controller within a sub-second time period.

FIG. 10 shows a practical indoor location system (PILS) architecture in accordance to some embodiments. As shown in FIG. 10, the PILS includes a trainer service, a system service 1010, signature database 920 and the decision engine 1040. System service 1010 may be of the Android Framework or an Android Application. System service 1010 specifically depicts actions that are performed during the log context trigger. At this stage, after receiving appropriate trigger, the context of the device is logged along with the currently received cellular signals in cellular signal fingerprints block 1012. The trigger may be opening a particular location based service (LBS) application, device power or any other application. The context block 1014 may include a location context or a specific user action. When the cellular signal fingerprint and a context are mapped to each other, it becomes the signature or fingerprint of the context.

The signatures generated by system service 1010 is cached or stored in signature database 920. The signature database 920 may be within the device (e.g., SD card) or it may be in a cloud storage system. The signature database 920 contains entries specific to each context and contains information about the various cellular signal information recorded, the actions from the user etc.

In some embodiments, when the device receives a get context trigger call, it reads the cellular signals observed at that time instant corresponding to observed current cellular signals 1022 and sends a query to the signature database 920 to get entries related to currently observed signals as the response. The trigger may be a static timer-based trigger or a user configured trigger or application-specific trigger. In computation block 1024, the computation of comparing the similarity of signatures and the current received signals take place. It involves computing scores for each related match obtained from the signature database and reordering the signatures based on variety of factors.

The result from block 1020 contains an ordered list of signatures which match the current cellular signal environment. If the list is empty, then there is no proper match with any signature. If the list has more than one match, the top-most match is considered as the output. The decision engine is specially designed to have application specific or user specific rules to be followed when deciding the final action (e.g., for two different users receiving the similar results from block 1020 can result in different action due to different policies set for every individual user. In Mobile Device Management scenarios, this is utilized to provide differentiated services specific to ever user policy configured by the administrator). When the policy criteria is met, the result is 'Yes' else it is 'No'.

The context information is shared with the Location Based Services (LBS) applications in block 960 and simultaneously additional data is collected to capture any environment changes happened after last such data recording. The data recorded follows block 1. This online training helps to keep the database updated at all times and avoids becoming stale. The LBS applications can perform any action deemed necessary. Hence PRiSM serves as a middleware service and can be used concurrently as a context gateway for any application.

In some embodiments, the signature database collected from every user may be combined with other user data and may be spread across multiple geographical areas in order to serve as a cache for easy server-side functioning and deployment.

The trainer service and the system service run at the application layer and the decision engine is at the platform layer of the Android stack. The trainer runs in the system background and constructs a list of unique signatures (inside the phone for privacy) for all locations visited by the user. The system service overhears the cellular signals at requisite time intervals to predict the location. The decision engine is designed to include a XML rule-set to decide which Location Based Services (LBS) get access to this location information from PILS. Hence, PILS can be attributed to a middleware component providing location information to all system services running in the device. If the location is predicted correctly, the signatures can be kept up-to-date by triggering a run-time training service to update the signature database. We implemented a prototype version of PILS in Android based devices for practical verification.

'LBS' (Location Based Service) applications, though not a main part of PRiSM operation, is shown in FIG. 1 since PRiSM also can serve as a middleware for all such applications in the smart phone. Only upon successful connection to an access point, we enter Online Training through which the signature database is kept up-to-date. It is done to capture environmental changes such as configuration updates in an access point, changes in indoor signal propagation paths and behavioral changes in the user. PRiSM suppresses Wi-Fi connection to an access point in poor signal strength regions and when the user moves closer to the same access point, it automatically matches the good signature of the access point and connects to it.

When PRiSM predicts an access point, it tries to connect to the access point even without scanning. If the ground truth (checked by connecting to the access point after every prediction) has an access point (i.e., true positive), the connection attempt becomes successful and hence reduces the time to connect to an access point by 33:7%. If the ground truth has no access point (i.e., false positive), the connection attempt will be unsuccessful and it auto-tunes the threshold parameters. PRiSM predicts no access point under two conditions: Zero Match (i.e., overheard BS ID's do not match with any stored Wi-Fi signature) and Threshold Mismatch (i.e., overheard BS ID's matched with some Wi-Fi signature but failed to satisfy the threshold parameters). In the case of zero match, PRiSM assumes the user is in a new place and scans all channels once to provide the results to the user. Here, it simultaneously aids for user experience and reduces energy on repeated scans until the user decides to connect to any access point. In the case of threshold mismatch, it first scans only those channels associated with its known list of access points in the database. If the scan results match with an access point in the database (i.e., false negative), it connects with the access point and simultaneously tunes its threshold parameters and hence saves energy instead of scanning all channels. If no match is found (i.e., true negative), PRiSM stops further scans and turns off the Wi-Fi interface to save energy from excessive unnecessary scans.

Cost Analysis

Cellular signals are received and processed all the time by the phone MODEM at no extra cost. PRiSM activates the CPU only to read cellular signal values from the MODEM and to compute using ATiS. At all other times, CPU is not activated by PRiSM and consumes negligible energy (0.6-1.1 μWh) on top of CPU base energy. The sampling policy is shown in Table 4.1. The overall energy costs for continuous Wi-Fi sensing using PRiSM is minimal when compared to normal Wi-Fi scan. Using the reverse hashmap, the signatures are computed only for the MACs with current observed BS IDs. Hence, PRiSM only compares the currently received signals with a small subset of signatures in the database irrespective of the total database size and saves on computation time. Thus the space and time complexity needed for computation is a function of the density of access points in the nearby environment and is almost constant. In our traces, the signature comparisons never exceeded 35 even though some users had up to 337 unique signatures stored in their database. Hence, PRiSM is more robust to handle database explosion.

TABLE 4.1

PRiSM cellular signal sampling policy.

| | Wi-Fi State | |
|---|---|---|
| Screen | Disconnected | Connected |
| ON | 1 sample every 20 sec | 20 contiguous samples every 60 sec |
| OFF | 1 sample every 20 sec | 1 sample every 60 sec |

Evaluation

In this section, information about the datasets used in the experiments and the results obtained are discussed. The simulation and practical verification results are separately discussed.

Datasets

Table 4.2 shows datasets from Android based devices running a customized monitoring application. Data was collected for over two weeks from graduate students (29), undergraduate students (6), and employees (5). Undergraduate students predominantly covered locations within the campus. Graduate students had both on-campus and off-campus locations. Each employee data is from a different urban city in the US.

TABLE 4.2

Dataset information

| Dataset | # of Volunteers | Total hours | Avg. Wi-Fi % |
|---|---|---|---|
| D1 | 24 | 2592 | 89.6 |
| D2 | 16 | 1440 | 81.3 |

Dataset 'D1' is obtained from our lab Nexus One phones used by volunteers as their primary device. It includes timestamp, Wi-Fi signal statistics for connected and neighbor access points, screen unlock info, and cellular signal statistics for connected and neighbor BSs. Dataset 'D2' is obtained from personal phones of volunteers due to non-availability of test phones in large numbers. It includes screen on/off information in addition to screen unlock information present in 'D1' but lacks neighbor BS information due to the closed nature of GSM API found in those phones. In both datasets, cellular signal and screen information are recorded at each second and Wi-Fi information at each minute. Since fine-grained screen activity information is required to accurately predict energy savings, we use 'D1' to analyze the algorithm accuracy and apply those parameters (false positives, false negatives, etc.) to 'D2' to predict energy savings. The devices recorded up to 35 access points in some campus locations. Also, the students recorded higher number of signatures for unique access points (up to 337) than the employees due to their movement patterns and the number of unique locations visited throughout the data collection period.

Accuracy Measurements

A trace-driven simulator builds the signatures and evaluates the accuracy of the algorithms by checking with the ground truth values in the dataset. The robustness of an algorithm depends on the proportion of true positives and true negatives correctly identified. The Receiver Operating Characteristic (ROC) curves shown in FIGS. 12 (a) and (b), the diagonal line represents the random prediction of an algorithm using a large random sample dataset, points above and below the diagonal represent good and bad prediction accuracy. ATiS obtains higher percentage of true positives and true negatives compared to other algorithms because ATiS uses the entire signal distribution from BSs and auto-tunes its threshold parameters as time evolves by adjusting itself to signal variations. However, other class of algorithms (BSSET and MSE are discussed in § 4.2.3) use average signal strength values from BS and persistent threshold values which either over-fit or under-fit the data. Though the results are shown from a single user for clarity, we observed a similar pattern across all users in the dataset.

False positive rate (FPR) is defined as the ratio of number of false positives over the sum of false positives and true negatives. True positive rate (TPR) is defined as the ratio of true positives over the sum of true positives and false negatives. Similarly True negative rate (TNR) is defined as the ratio of number of true negatives over the sum of true negatives and false positives. False negative rate (FNR) is defined as the ratio of number of false negatives over the sum of false negatives and true positives.

False positive ratio ($\rho_{FP}$) is defined as the number of cases that an algorithm detects an access point when there is no such access point in the ground truth divided by the total number of cases. Similarly, false negative ratio ($\rho_{FN}$) is defined as the number of cases that an algorithm detects no access point when there is an access point in the ground truth divided by the total number of cases. Higher $\rho_{FP}$ indicates losing more chances for energy saving and higher $\rho_{FN}$ indicates losing more connection opportunities. FIG. 12 (c) shows that BSSET and MSE class of algorithms require very high threshold values to achieve lower $\rho_{FP}$ values, which results in undesired higher $\rho_{FN}$ values. ATiS achieves lower $\rho_{FP}$ and $\rho_{FN}$ values simultaneously and hence results in minimum lost opportunities for connection with maximum energy saving. FIG. 13 (a) shows the variation in mean $\rho_{FP}$ and $\rho_{FN}$ values for individual users over their entire evaluation period suggesting the difference in their mobility patterns and the places they visit. The overall $\rho_{FP}$ and $\rho_{FN}$ values for all the users in the dataset 'D1' averaged to 1.10% and 0.19%, which is very close to zero (ideal value). Since PRiSM starts predictions from day-1, we show the variation in the values after each day in FIG. 13 (b). Hence, even with small number of samples in acquired data during the initial few days, ATiS keeps the false positives and false negatives low and it further improves as time evolves.

Energy Measurement Setup and Calculations

Energy measurements are obtained from Monsoon power monitor connected to the phone with values recorded every 200/s. Since PRiSM modifies default Wi-Fi connection framework, we obtain fine-grained energy information for important Wi-Fi processes as shown in Table 4.3. The Wi-Fi measurements are obtained by subtracting the background energy (which includes CPU, LCD, and backlight) from total consumed energy. Extensive trials are performed using an automated program to avoid finger touch events on the LCD screen and to avoid sensitive fluctuations in power consumption. We also remove all background processes and turn off other sensors not associated with the Wi-Fi to avoid energy variations. For trace-based simulation, we first extract Wi-Fi event information (e.g., radio-enable, scan, authentication) for various screen activity conditions recorded in the dataset and combine with practical usage values in Table 4.3 to accurately calculate the total energy consumption by Wi-Fi usage specific to each particular user for each day.

TABLE 4.3

Fine-grained measurements for Wi-Fi sensing.

| | Energy Consumption (mWh) | | | |
|---|---|---|---|---|
| | HTC Nexus One | | Samsung Galaxy S5 | |
| Item | On | Off | On | Off |
| Screen | | | | |
| Wi-Fi Radio Up | 0.0043 | 0.1181 | 0.2528 | 0.3164 |
| Wi-Fi Radio Down | 0.0405 | 0.0606 | 0.0510 | 0.2993 |
| Scan | 0.1376 | 0.1955 | 0.5333 | 0.5811 |
| Auth/Assoc | 0.1588 | 0.2711 | 0.2570 | 1.4481 |
| PRiSM Active | 0.0019 | 0.0173 | 0.0015 | 0.0012 |
| Wakelock | NA | 0.0241 | NA | 0.0527 |
| CPU Normal | 0.2706 | 0.0059 | 0.0871 | 0.0325 |

Default Wi-Fi Vs. Footprint Vs. PRiSM

In FIG. 14, we compare the energy consumed by PRiSM with three other Wi-Fi sensing systems: Default Wi-Fi refers to Wi-Fi in off-the-shelf phones, Footprint refers to the Wi-Fi sensing system, and Ideal refers to the imaginary oracle sensing system introduced for user clarity. We define the characteristics of an ideal system as: uses zero system/CPU energy to identify Wi-Fi access point, connects automatically to the access point without scanning, and shuts down Wi-Fi radio immediately in places where Wi-Fi is absent. PRiSM implements a full version of a sub-optimal algorithm, PRiSM-SubOpt, which scans for access point before connection and a prototype version of an optimal algorithm, PRiSM-Opt, which knows access point channel information and connects directly without scanning.

Footprint triggers scan based on distance moved by the user (more than 10 m indoors or 20 m outdoors). In no Wi-Fi areas, Footprint scans for Wi-Fi first and later records all places which do not have Wi-Fi bloating its history list. Even in areas with Wi-Fi, unless the user moves, it does not scan even if the Wi-Fi radio is turned off after screen off delay.

PRiSM, however, checks for Wi-Fi availability every sampling period and connects to Wi-Fi if needed, else, it maintains the radio in off state. Also, it connects directly to the access point without scanning and avoids turning on Wi-Fi in poor signal strength areas and hence saves energy intelligently. Since energy measurements for Footprint is not available and implementing the entire system is out of scope in our experiments, we combine the accelerometer energy value (0:667 mWh) obtained in our test measurements to sample cellular signals thrice (0:006 mWh for screen-on and 0:052 mWh for screen-off) to calculate the additional cost incurred by Footprint in both screen on (Δ1) and off (Δ2) conditions to be 0:673 mWh and 0:719 mWh per minute. For a stationary user, Footprint effectively suppresses Wi-Fi scans in no Wi-Fi areas, but still incurs the overhead energy from accelerometer usage, which is significantly high compared to PRiSM. For a moving user, Footprint consumes more energy than default Wi-Fi and PRiSM. When Wi-Fi is available, PRiSM-SubOpt consumes slightly higher energy than default Wi-Fi since it uses extra energy for cellular overhearing. However, PRiSM-Opt always consumes less energy than default Wi-Fi by design. The Ideal system always consumes the lowest possible energy and provides a baseline to compare for the maximum amount of energy that can be saved by any Wi-Fi sensing system.

Effect of Sensing Intervals (δ) and Wi-Fi Thresholds (τ)

The energy consumed by PRiSM and an Ideal system for various sensing intervals (δ) and Wi-Fi thresholds (τ) is discussed here. We do not compare Footprint because of the non-availability of accelerometer values in our dataset. Also, PRiSM does not measure distance from access points or discriminate between indoor and outdoor locations. The energy savings vary between users and depends on their individual mobility patterns and Wi-Fi availability (e.g., Users who often experience poor and no Wi-Fi situations save more energy than users who experience good Wi-Fi. The reason is in good Wi-Fi areas, the only avenue to save energy is to avoid scan costs). We define battery capacity as the maximum amount of energy that can be extracted from a smart phone battery and is assumed to be 5000 mWh in our energy calculations.

Figure 15:
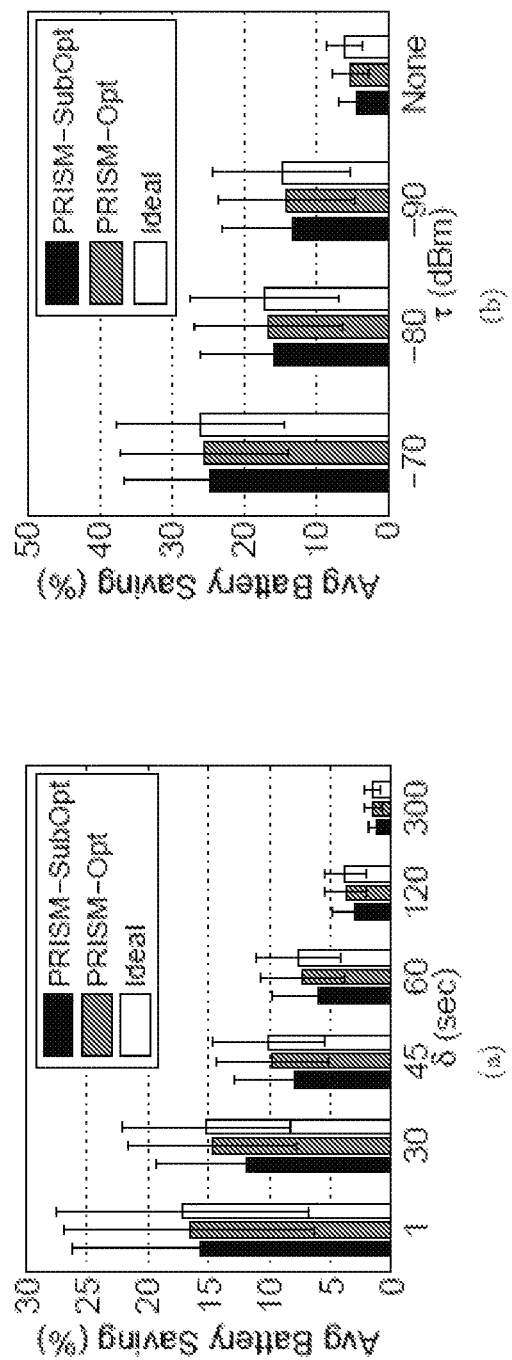
FIG. 15 illustrates the Mean battery savings for all users in the dataset with 95% confidence interval. (a) vary κ given T=−80 dBm, (b) vary δ given T=1 sec.

Sensing interval of δ=1 sec is equivalent to keeping the Wi-Fi interface continuously ON. When δ increases, the average battery saving for all users combined decreases steadily as shown in FIG. 15 (a). The decrease in energy saving from that of 1 sec scanning is because of following reasons: scan is not performed continuously and during the time slots (e.g., δ=30 sec, 45 sec. 5 min), only 20 sec of time slot is utilized for sensing operations and the Wi-Fi radio is turned OFF for remaining time. Email sync applications are shown to take close to 18:54 sec. Hence, we assume a constant time of 20 sec for the purpose of evaluation and can be varied if necessary. We see that PRiSM-Opt achieves close to 96% in average battery savings to that of an ideal system. The variation in average battery savings for all users for different thresholding values (τ) is shown in FIG. 15 (b). The decrease in savings with smaller thresholds (τ=−90) is due to increased energy usage to connect to Wi-Fi in poor signal areas. Even under no thresholding (τ=None), ATiS achieves close to 90% of that achieved by an ideal system. This shows that the huge energy savings of PRISM are mainly due to the better performance of ATiS algorithm and not just the RSSI thresholding parameter. However, to provide better user experience and also to save on battery energy, PRiSM as a system, uses a default value of τ=−80 dBm.

Overall Energy Impact

Wi-Fi sensing measurements in Table 4.3 show that latest Samsung Galaxy S5 phones consume more energy compared to older Google Nexus One phones because of powerful Wi-Fi chipsets. We infer that in spite of all the commercial advancements made in recent times to reduce the power utilization in Wi-Fi radio's (e.g., better sleep cycles, reduced idle times), scanning for Wi-Fi access point still requires substantial energy. Hence, PRiSM in general can save substantial battery energy in all phones without discrimination. From Table 4.4, users spend about 30% of battery energy on average for Wi-Fi sensing operations. We observed that about 11.24% of that energy is wasted for Wi-Fi sensing in regions with poor/no Wi-Fi combined, which is very significant. On average, PRiSM saves about 16.51% of total battery energy, which is equivalent to saving almost 825:5 mWh worth of energy spent on Wi-Fi if we assume the battery capacity to be 5000 mWh. estimates the average battery lifetime ('battery lifetime' refers to the operating time of the battery from one full charge to full discharge) of a smart phone to be 40 hours and 27 hours for casual and regular usage respectively. Using this result, we observe that PRiSM on average can extend the battery lifetime by 6.6 hours and 4.5 hours for casual and regular phone usage respectively. Given that about 70% of users in our dataset travelled in 'Good Wi-Fi' areas, energy savings for PRiSM will be much higher if users had high mobility patterns in 'No Wi-Fi' and 'Poor Wi-Fi' areas, which happens more often in practice.

TABLE 4.4

Total Wi-Fi usage and battery savings for users in dataset 'D2' for Wi-Fi offloading with $\tau$ = −80 dBm.

| User | Wi-Fi Avail (%) | | | Wi-Fi Battery Usage (%) | Battery Savings (%) | | |
|---|---|---|---|---|---|---|---|
| | Good | Poor | No | | PRiSM-SubOpt | PRiSM-Opt | Ideal |
| 1 | 82.92 | 6.69 | 10.40 | 21.79 | 6.45 | 7.24 | 7.79 |
| 2 | 94.62 | 0.49 | 4.90 | 21.26 | 1.96 | 2.91 | 3.57 |
| 3 | 48.60 | 6.03 | 45.37 | 20.15 | 14.52 | 14.83 | 15.24 |
| 4 | 74.56 | 2.56 | 22.87 | 19.95 | 6.37 | 7.11 | 7.63 |
| 5 | 11.73 | 74.69 | 13.58 | 60.08 | 57.04 | 57.20 | 57.83 |
| 6 | 71.12 | 25.29 | 3.59 | 42.24 | 23.23 | 24.22 | 25.00 |
| 7 | 61.82 | 10.92 | 27.26 | 36.11 | 23.18 | 23.86 | 24.62 |
| 8 | 71.52 | 9.54 | 18.95 | 34.65 | 18.97 | 19.77 | 20.57 |
| 9 | 97.71 | 0.80 | 1.50 | 15.29 | 0.34 | 1.10 | 1.57 |
| 10 | 91.36 | 4.37 | 4.27 | 33.39 | 5.42 | 6.82 | 7.74 |
| Avg | 70.59 | 14.14 | 15.27 | 30.49 | 15.75 | 16.51 | 17.16 |
| % of Ideal achieved | | | | | 91.79 | 96.20 | — |

Practical Verification of Energy Savings

We identified test phones with similar battery aging by comparing the amount of time it took them for a full battery discharge with bare-essential Android system processes. Practical verification of energy savings shown in Table 4.5 involved two phones: one normal phone and other running PRiSM-SubOpt. A mock application was installed on both phones to check for Wi-Fi at different sensing intervals. The application just connects to the access point and no data transmission is done since energy consumption may change with different data transfer rates even to same access point's at a particular time instant. For an RSSI threshold setting of r=None, the sensing intervals for 30 sec, 60 sec, and 120 sec saw average Wi-Fi availability of 55.20%, 77.32%, and 0% respectively. This Wi-Fi availability is calculated by comparing the Wi-Fi connectivity information recorded from user logs and the signature database file given to the users for test. For δ=30 sec, PRiSM obtained huge energy savings in no-WiFi areas and incurred minimal energy overhead in areas with Wi-Fi. For δ=60 sec, PRiSM should have had more battery left at the end since the sensing intervals are less frequent but recall that PRiSM only saves energy on scan costs in areas with good Wi-Fi. Given that users saw an average of 77.32% Wi-Fi, only about 9% of battery remained. For δ=120 sec, we specifically tested the scenario where user visits totally new places (i.e., with zero stored information about the location in database and hence 0% Wi-Fi availability to connect). Hence, the energy savings by PRiSM is more in this scenario than previous sensing intervals even though the Wi-Fi sensing operations are less frequent at every 120 sec. The results show that in all cases, PRiSM-SubOpt had substantial amount of battery left when the normal phone is completely discharged. We believe that PRiSM-Opt will save even more energy in these situations.

| | Wi-Fi Sensing Interval (δ) | | |
|---|---|---|---|
| System | 30 sec | 60 sec | 120 sec |
| Normal | lasted 14.5 hrs | lasted 24.3 hrs | lasted 33.0 hrs |
| PRiSM | had 54% left | had 9% left | had 65% left |

PRiSM places no restrictions to the users in the way they hold their phones or the places they visit. Each user accumulated dynamic cellular signal variations from distinct antenna gains and antenna placement in their devices. PRiSM constructs unique signatures in every device and hence, operates on the assumption that a user connected to the logical Wi-Fi location previously before evaluation phase. As discussed earlier, for Zero-match case, PRiSM creates signatures for the new location only after manual user input. Hence, it only creates signatures for user specified logical locations and reduces meaningless signatures but requires manual supervision. To reduce this limitation, a centralized signature database can be implemented and shared using crowd sourced data. In one embodiment, only Nexus One phones were used to collect data since we get neighbor cell information in addition to connected cell information from the Android software stack.

Load balancing or Cell breathing techniques are used in CDMA systems where the Base Station (BS) output power is split among active users. Hence, coverage range of cellular towers is shrinked based on user load. In GSM and current LTE systems, each BS usually transmits with full transmission power in the downlink. Based on the location of the mobile within the coverage area, it receives a percentage of the transmitted power which PRiSM utilizes to logically localize locations. PRiSM is not heavily impacted by this because it uses both connected and neighboring cell towers for estimation and hence, absence of one or two BSs does not affect its working. Also note that PRiSM periodically updates the signal strengths for the signatures whenever the user visits the logical locations and hence, provides a robust method to update the database.

An example rule (not given in XML format for the sake of clarity) input that can be implemented in the decision engine is "do not connect to a particular access point on weekdays but do connect on weekends". Hence, PRiSM filters its decision based on the day, even though the access point is available at all days. We see many potential applications for the decision engine in PRiSM (e.g., Cellular network carriers can dynamically modify data-offloading rules for their customers based on their real-time network congestion levels at a location. This can facilitate fast handover between Wi-Fi and cellular data usage and readily complement commercial ISP solutions like Hotspot 2.0. Note that Hotspot 2.0 promises seamless Wi-Fi authentication and handoff, but still needs to identify places with good Wi-Fi).

Some access points do not allow data transmission even after successful connection with the access point (i.e., closed). PRiSM currently does not handle this specific case, but works well for both open and password protected access points if the device has connected to those access points previously. This limitation can be rectified by first performing additional data connectivity check on each newly connected access point. Closed APs can then be added to a separate list to avoid future connections. Recently, Apple© blocked Wi-Fi scans initiated from any user application and made its Application Programming Interface (API) private. However, PRiSM does not initiate scans, instead, it records information such as AP name, MAC ID's, and the signal strengths after system initiated connection. Though PRiSM is implemented in Android, its functioning holds good for most mobile operating systems in general.

A Wi-Fi detection system, PRiSM, is provided herein, which utilizes the freely available cellular signal information of GSM signals to statistically map the Wi-Fi access points with a logical location information. The signal strengths from these base stations are recorded, however, the geographical coordinate location of these base stations is not required. PRiSM runs in the background and reads cellular signals based on a scheduling policy and hence consumes minimal energy overhead. We use a novel technique to dynamically build and update the signature clusters in near real-time and thus avoid the need for an extensive training phase.

Additionally, a specialized statistical matching algorithm is provided herein, which uses a likelihood estimation technique to automatically tune the decision thresholds for every signature. The threshold values are tuned by connecting to access points and comparing against the ground truth values (i.e., access point available, unavailable). We also implement a novel selective-channel Wi-Fi scanning framework to automatically connect to the access points without scanning or association by utilizing their stored frequency channel information. The empirically constructed signal distributions and decision thresholds for a Wi-Fi location can be adapted or learned as time evolves. We implement PRiSM on Android devices and perform both trace-based simulation and practical evaluation. PRiSM obtains up to 96% of energy savings in Wi-Fi sensing operations equivalent to saving up to 16% of total battery capacity, together with an average prediction accuracy of up to 98%.

Context-Aware Indoor Positioning System Via Cellular Multi-Homing

Smart devices have become one of the primary ways for people to access entertainment and other business applications. Most of these applications provide location-specific services and hence, require either the absolute or logical location of users in indoor settings. Big retail giants and shop vendors in indoor locations such as malls, public convention center's aim to provide specific deals and discounts to users who are within walking distance from their shops. Identifying the context of a user (e.g., in front of the store, suits section, billing counter) in a timely and practical manner is very important for the retail outlets to disburse appropriate deals.

Another fast developing trend is to selectively activate certain security features for smart devices in Enterprise Device Management (e.g., turn off camera inside office space, disable voice recorder in conference room). In the above applications, 'front of the store', 'billing counter', 'conference room' are few examples of logical locations or in the broad-sense referred to as the 'context' of the smart device. In all these cases, though sub-meter level accuracy is not required or expected, accuracy of the order of few feet (≈5 to 10 ft) is highly preferred. However, to design a precise and an energy-efficient indoor localization system in an automated manner is (still) a very non-trivial task. The reasons include the need for: infrastructure-independent solutions, ease of practical deployment, and minimal battery consumption for users. With the advent of small cells and millimeter wave technologies, we aim to focus the research community to look to utilize 3G and 4G cellular network characteristics for energy-efficient and practical indoor localization. Here, we develop PILS, a new context-aware indoor location detection system, to statistically map a context to an indoor location in a logical manner.

Cellular Multi-Homing

Figure 17:
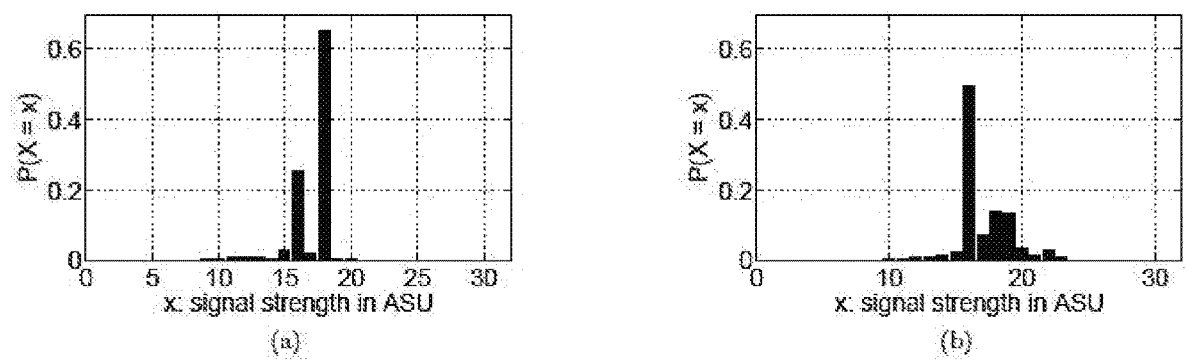
FIG. 17 illustrates Cellular signal strength distribution of the mostly observed base stations at (a) location A and (b) Location B.

Cellular Multi-homing is the technique used by any user equipment (UE) or smart device to camp on the cellular tower signals from multiple generations (e.g., 2G, 3G, 4G-LTE). Using this technology, the smart device can receive much better information about its context and surroundings because it can correlate the signal strength information from multiple cellular base station towers. We attempt to measure a variety of statistical information pertaining to cellular signals received by smart phones and study how we can construct a database of reliable cellular signal signatures per location. We then investigate the feasibility of distinction among locations recorded in the database based on their signatures. Here, we provide our findings for general GSM-based cellular signals. We store the signature for a location as a XML element as in FIG. 16. The structure of the specialized data structure designed for PILS is shown below. Cellular signals are ubiquitous in nature and are received continuously by the phones. A smart phone can receive signals from more than ten base stations (BSs) in dense urban areas. GSM based Android phones can overhear signals from up to seven (six neighboring and one connected) BSs in ASU (Active Set Updates) units. The linear equation between dBm and ASU values for GSM networks is dBm=2ASU-113. ASU values range from 0 to 31 and 99, which indicates unknown signal strength. We analyzed the statistics for signals collected at different locations but for explanation purposes, we take random locations to show the following results. FIG. 17 (a) and FIG. 17 (b) show PDFs (Probability Density Functions) of signal strengths for the same BS from two adjacent rooms. They see very different signal strength patterns and hence can be effectively used to distinguish the locations if we capture the entire signal statistics for those locations. To do so, we propose to build cellular signal signatures using "probability distributions" of signal strengths from observable base stations rather than using abstracted information (e.g., "average signal strengths").

Figure 18:
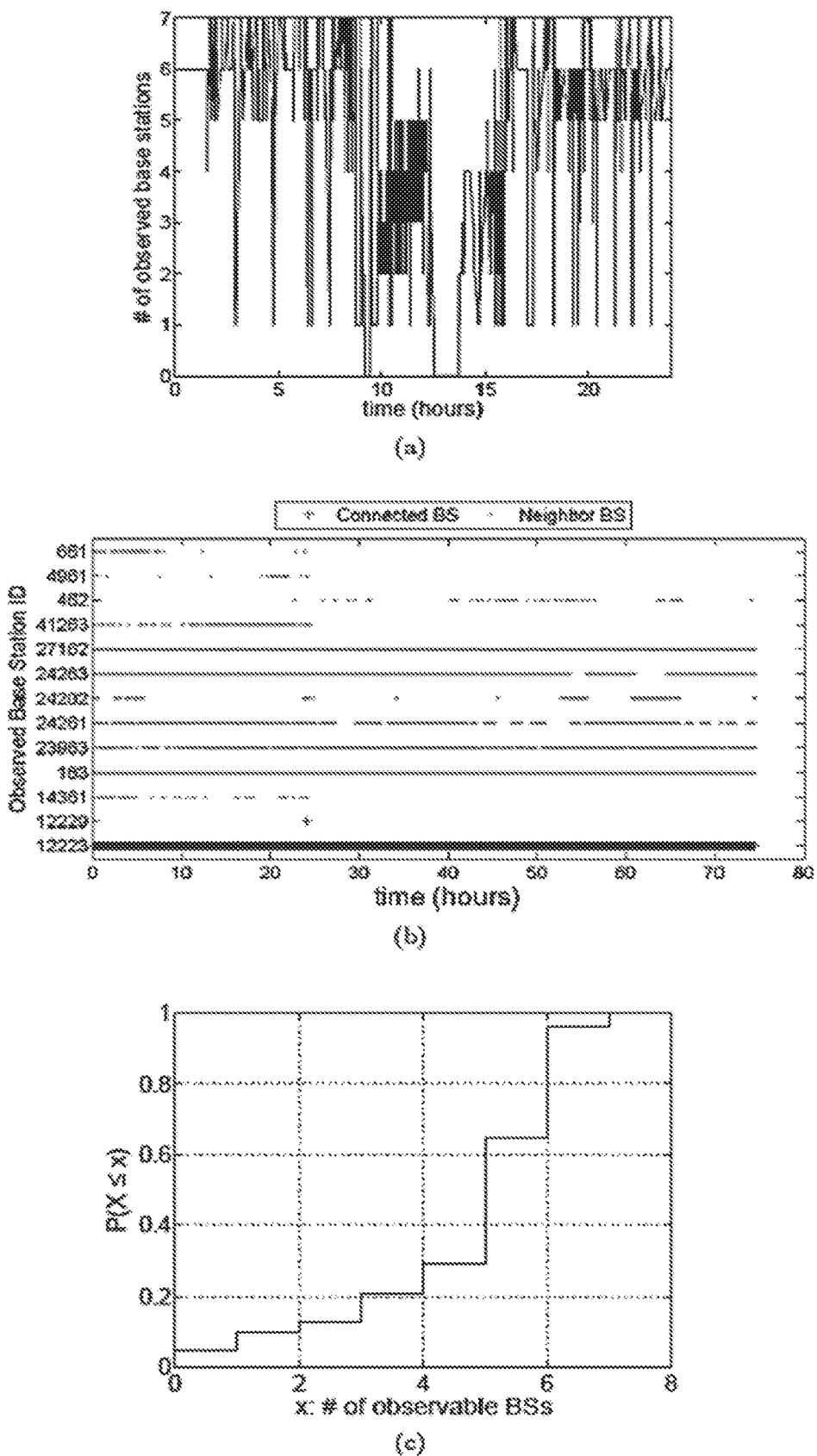
FIG. 18 illustrates (a) The number of observed base stations over time at a location. It fluctuates from 0 to 7. (b) The observed base station IDs over time. (c) CDF of the number of observed base stations.
Figure 21:
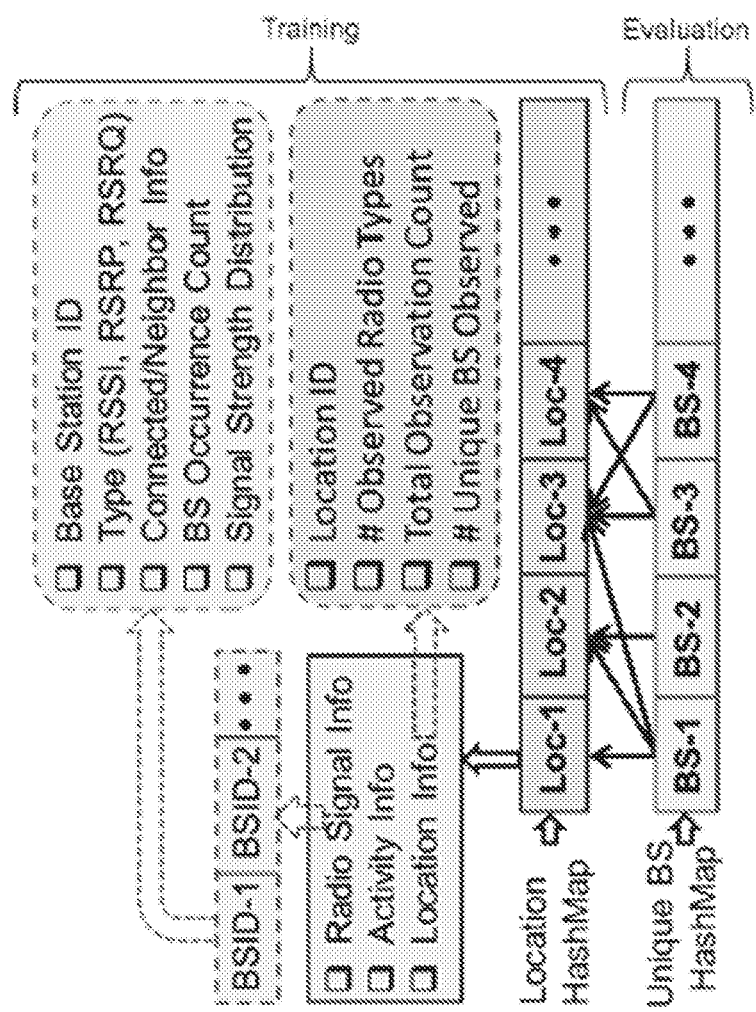
FIG. 21 illustrates a PILS contextual signature storage database in accordance to some embodiments.

FIG. 18(a) shows the variation in the number of observed BSs between 1 and 7. It is due to the changes in user movement pattern and environment conditions. Different locations observe different BSs or different signal strength patterns from the same common BS. FIG. 21 (b) shows the variation in the BS observation pattern over time. While many BSs are observed intermittently, some reliable BSs are observed continuously. The connected BSs change over time even at a given location due to channel fading. FIG. 21 (c) shows the CDF (Cumulative Density Function) of the number of observable BSs at a location. The number is more biased toward seven for urban settings where the density of BSs is more.

FIG. 19 shows the evolution of signatures recorded at a location for a considerable number of hours. For better readability, we plotted only the signal strength distribution from the BS which has been most frequently observed in the corresponding signature. Simply put, the cumulative distribution after 100 hrs includes the distribution after 50 hrs plus fifty more hours. Note that the signal strength distributions do not converge to a Gaussian distribution even after a good amount of time. Hence, we need a non-parametric algorithm which does not assume anything about the underlying data distribution. Multiple peaks shown in each distribution confirm that different locations experiences characteristic signal patterns. The correlation coefficient ($\rho X_1$, $X_2$) between probability distributions accumulating signals for different amounts of time clarifies the existence of characteristic patterns in the signatures. From our experiments, high value of correlation coefficients and low cross-correlation values indicate that our statistical technique is likely to provide good performance in matching accuracy.

We also find that the signatures recorded at locations far from or near to each other have significant dissimilarities. We choose three locations: X, Y, and Z, where the radial distances between X and Y is about 4 miles and between Y and Z is about 15-20 meters (Y and Z are in the same building). In the figures, base station IDs and their average signal strengths are given in the legend. As expected, the signatures for X and Y contain completely different sets of BSs and different patterns of signal distributions. On the other hand, the signatures for Y and Z show similar sets of BSs. However they are still distinguishable because the signal distributions show unique patterns. Considering the possible differences in the environment factors, observing dissimilar signal distributions even for nearby access points is not surprising and actually helps to identify the access points more reliably.

It is also to be noted that, in addition to visually verifying that the data does not fall under a Guassian distribution, we also statistically verify it by drawing QQPlot. In a QQPlot, the null hypothesis is usually that the data samples are distributed normally with an unspecified mean and variance. is a plot of the sorted values from the data set against the expected values of the corresponding quantiles from the standard normal distribution. If the proposed null hypothesis holds true for the dataset, then the plotted points should approximately lie on a straight line. This is shown for a location is FIG. 19.

RSRP and RSRQ Parameters

We performed similar experiments on 3G and 4G cellular radio signals and found similar distribution characteristics for signal strengths as discussed previously for 2G radios above. In 4G LTE radio system, in addition to observing the signal strength values, we also recorded the RSRP and RSRQ values. These parameters are described in the 3GPP standard specification. RSRP (Reference Signal Received Power) is a type of RSSI-based measurement. It measures average received power over cell-specific reference signals and hence, can provide better power information related to different locations unlike regular RSSI (Receive Strength Signal Indicator). RSSI values contain power belonging to serving cells, co-channel cells, thermal noise etc. RSRQ (Reference Signal Received Quality) is a parameter which provides the quality of received signals in the user device. These parameters are used in cell handover process and hence, we believe using these back-channel parameters in addition to the regular signal strength values can substantially increase the localization accuracy.

5.2.3 Practical Algorithm

We design an algorithm that can utilize detailed statistical properties of cellular signals instead of the averaged signal strength values. A simplified version of ATiS (Automatically Tuned Location Sensing) is explained in Algorithm 2. Since the entire signal distribution is available, ATiS predicts the location in near real-time. A higher level intuition of the algorithm is that if the probability of seeing a particular signal strength within the PDF of a base station (BS) is high and the probability of the BS observed at a particular location is high, the total joint distribution is maximized and we get a more accurate signature match. ATiS utilizes a set of signatures (P) each consisting of a set of base stations $R_j$ and corresponding signal strength distributions $f_{k,j}(S)$, where $k \in R_j$ and $j \in P$. Note that j and k are signature ID's (e.g., Location IDs) and cellular base station ID's respectively. Each signature P has information pertaining to the number of occurrences made by its individual base stations in n(k, j) and the total occurrences of all its base stations collectively in $N_j$. The maximum likelihood of the currently observed signals, $s_k(t)$ for $t \in [t_1, t_2]$, from the base station k is calculated as v(k,j) for the signature j.

ATiS computes the likelihood scores using expectation maximization techniques based on the Bayesian Networks. For any input BS, it does a local normalization of signal strength values surrounding the target signal strength in the database and hence, performs well even under signal fluctuations. The closer the match of input BS within a signature, the better is the score for the location. All signatures whose likelihood scores satisfy the lower bound ($C_L$) and upper bound ($C_U$) thresholds are returned as output in descending order of their scores. The values of $[C_L, C_U]$ are initialized with [1, 0] initially. The upper bound gradually decreases and the lower bound gradually increases based on ground truth to achieve a tight threshold range. ATiS auto-tunes thresholds within 0-1 based on likelihood scores and hence, does not over-fit the data for any particular scenario. PILS also uses a hash-map of unique location labels to store the signatures in a cluster and a reverse hash-map of observed BS IDs to labels. The signatures are thus computed only for the locations with current observed BS IDs. Hence, by design, PILS utilizes a cluster-reduction approach to only compare the currently received signals with a small subset of the signatures in the database irrespective of the total database size and saves on computation time to compare from all the signatures otherwise.

Data Storage and Retrieval

PILS has a novel implementation for the signal statistics distribution storage. An overview of the storage database implementation for storing the contextual signatures is shown in FIG. 21. The locations are organized in a hash-map based on the location ID's and every location ID has a cluster of observed BS ID's from different radio types. For every BS ID, a list of values is stored corresponding to every unique signal strength. Whenever, a new database update is triggered, the individual count values in the list are just incremented and hence, PILS achieves near-real-time database updates. This is very significant because, PILS totally avoids the training phase required by most AI algorithms. Also, there is no need to stop the localization service during database update. Every such location cluster is mapped as a XML element as shown in FIG. 16. When a user needs to change the phone, the entire dataset distribution can retrieved as an XML document and transferred to the new device. Hence, PILS can facilitate signature data distribution easily between multiple devices and can help provide a truly ubiquitous experience.

Cellular signals are received and processed all the time by the phone MODEM at no extra cost. PILS activates the CPU only to read cellular signal values from the MODEM and to compute using ATiS. At all other times, CPU is not activated by PILS and consumes negligible energy (0:6-1.1 µWh) on top of CPU base energy. The sampling policy is usually set at 20 contiguous samples every 60 seconds. However, the sampling rate can be increased or decreased dynamically based on the situation needs (e.g., While user is walking, the sampling rate can be higher to provide quick location updates). The energy consumption for running PILS is compared to other approaches used for location sensing in Table 5.1. The energy given in the table includes the energy for signal sampling, ATiS functioning and base CPU energy. Using the reverse hash-map, the signatures are computed only for the location clusters with current observed BS IDs. Hence, by design, PRiSM only compares the currently received signals with a small subset of signatures in the database irrespective of the total database size and saves on computation time to compare from all the signatures otherwise. Thus the space and time complexity needed for computation is a function of the location clusters identified by the current observed BS ID and is almost constant.

TABLE 5.1

Energy consumption information per second between PILS and other approaches used for continuous location sensing.

| Item | Energy Consumed (mWh) |
| --- | --- |
| Wi-Fi Scan | 0.1185 |
| Accelerometer | 0.6670 |
| GPS | 1.5800 |
| PILS | 0.0173 |

A customized monitoring application is provided herein for Android based devices to obtain data from locations inside buildings. Dataset information is provided in Table 4.2. We obtained data from several different environments: home, office, shopping mall, library, university classroom and hallways. The actual dimensions of the library were not available and different classrooms had different dimensions ranging from 7.25 m×6.75 m to 13.25 m×13.25 m. The figure shows that trial locations include both rooms and open locations. Three Samsung Galaxy S5 phones were used by lab personnel to gather data from the home and office locations. The radial distance between the adjoining spots in the office and home estimate between 5-20 meters with each other. More information regarding the dataset is given in Table 5.2.

TABLE 5.2

Dataset information.

| Environment | Dimensions (m) |
| --- | --- |
| Home | 10 × 15 |
| Office | 20 × 35 |
| Mall | 220 × 15 |
| Indoor Hallway | 80 × 2 |

Accuracy Measurements

A trace-driven simulator builds the signatures and evaluates the accuracy of the algorithms by checking with the ground truth values in the dataset. The training and test data are collected separately at different time intervals. The signature database is trained using the training set and the test data is evaluated against the database. In the following figures, self-sourced data infers that the data is collected from the user's personal phone and crowd-sourced data infers that the data collected from the devices of all users are combined and the results are validated against the entire database.

Figure 23:
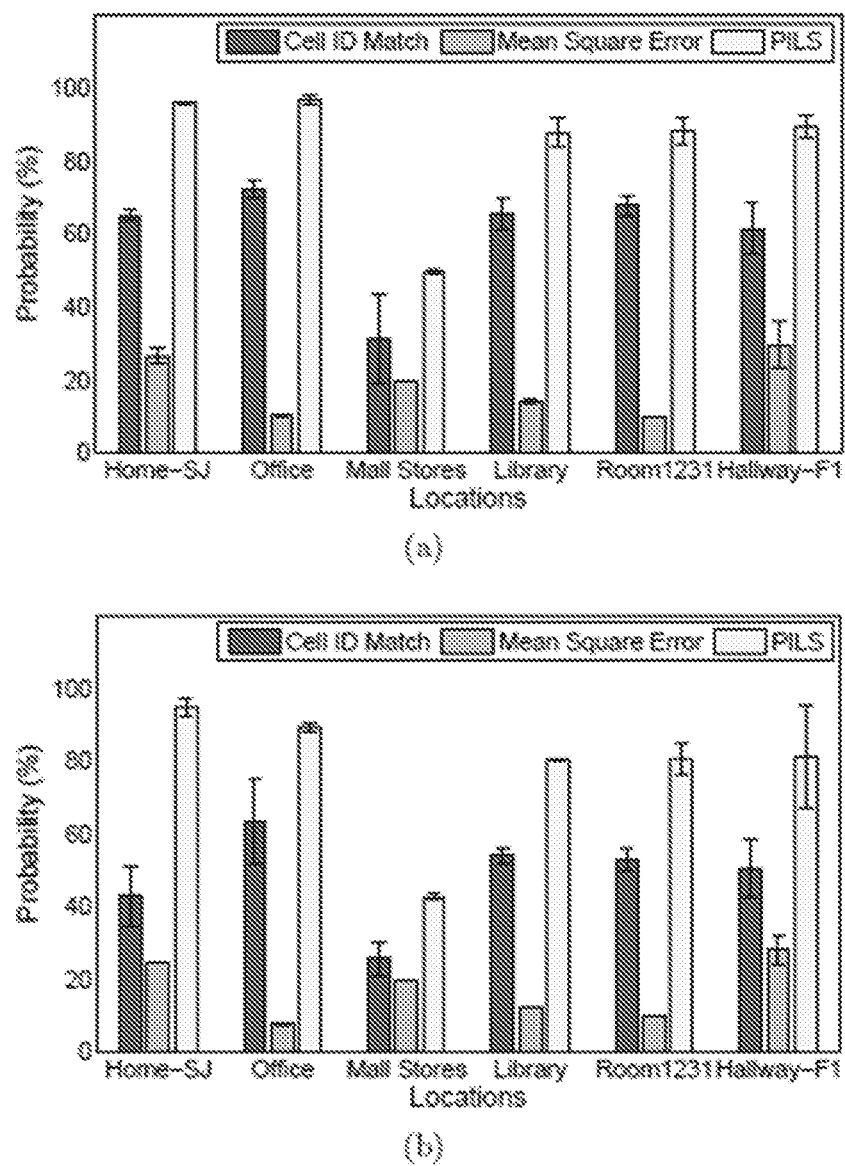
FIG. 23 illustrates the prediction probability for various environments using (a) Self-Sourced data (b) Crowd-Sourced data.
Figure 24:
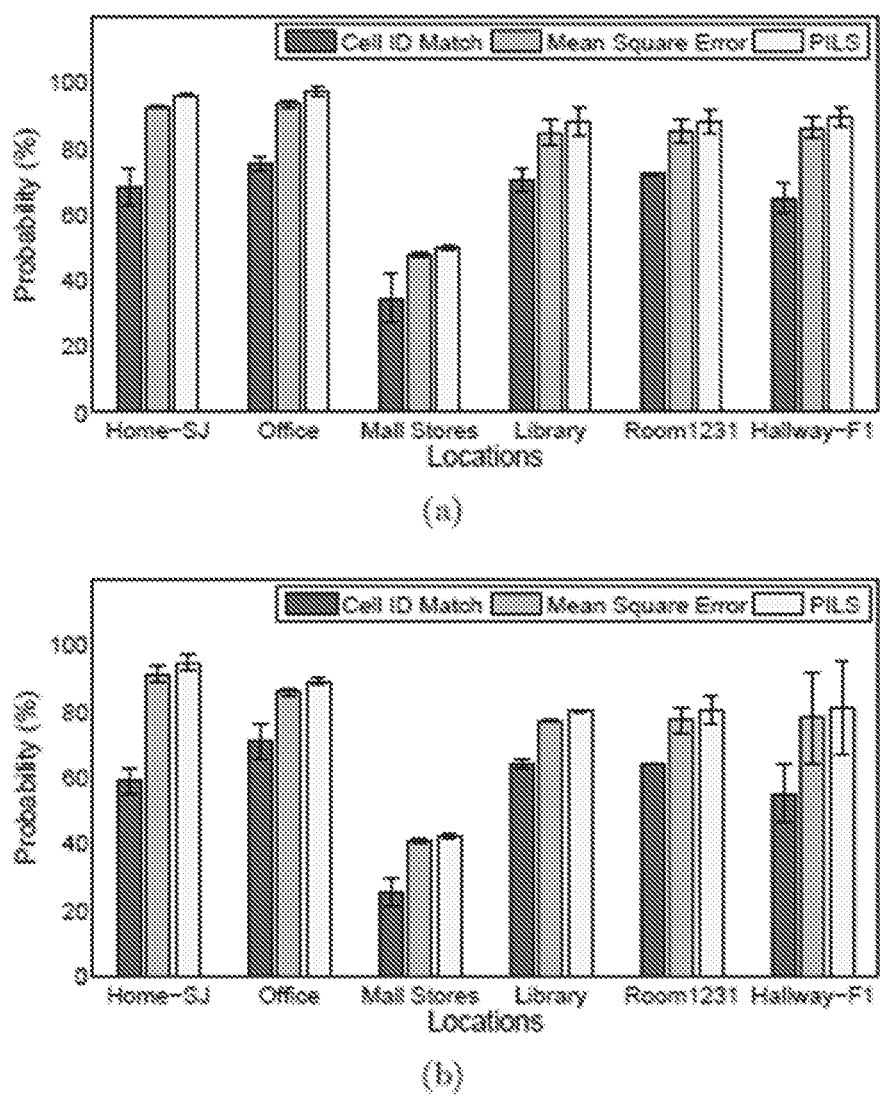
FIG. 24 illustrates the prediction probability for various environments with special sorting techniques for BSSET and MSE using (a) Self-Sourced data (b) Crowd-Sourced data.
Figure 25:
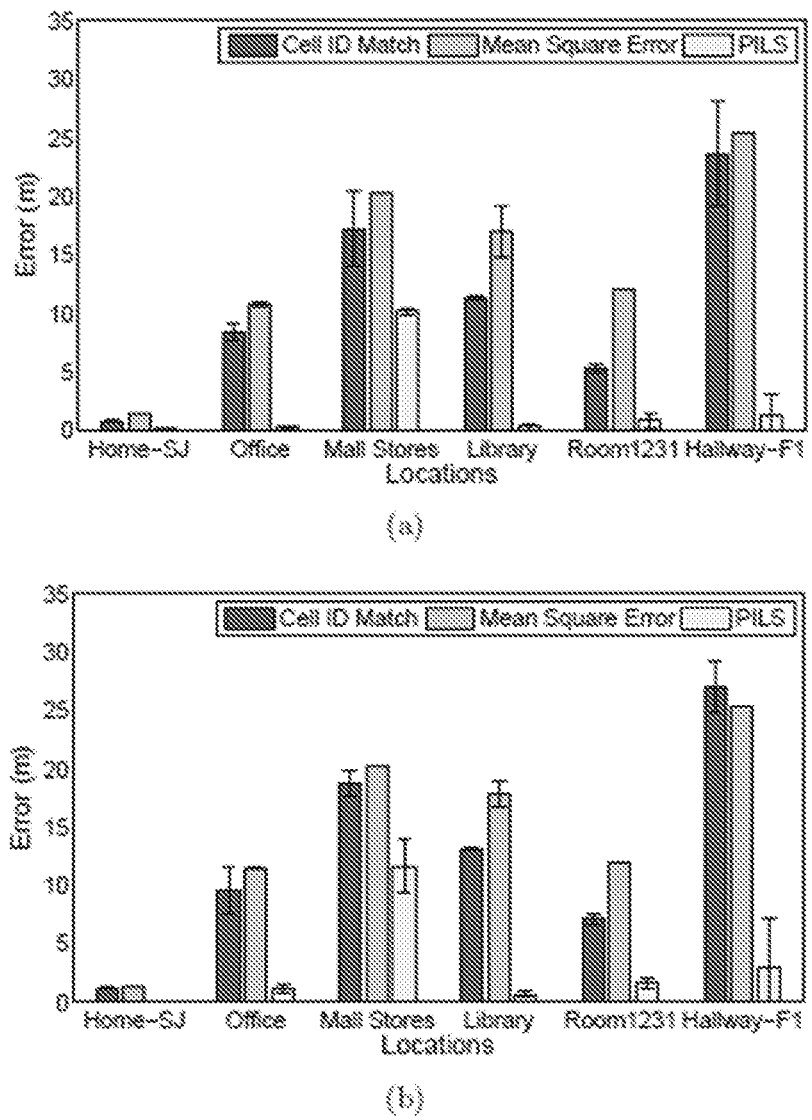
FIG. 25 illustrates the prediction error for various environments using (a) Self-Sourced data (b) Crowd-Sourced data.
Figure 27:
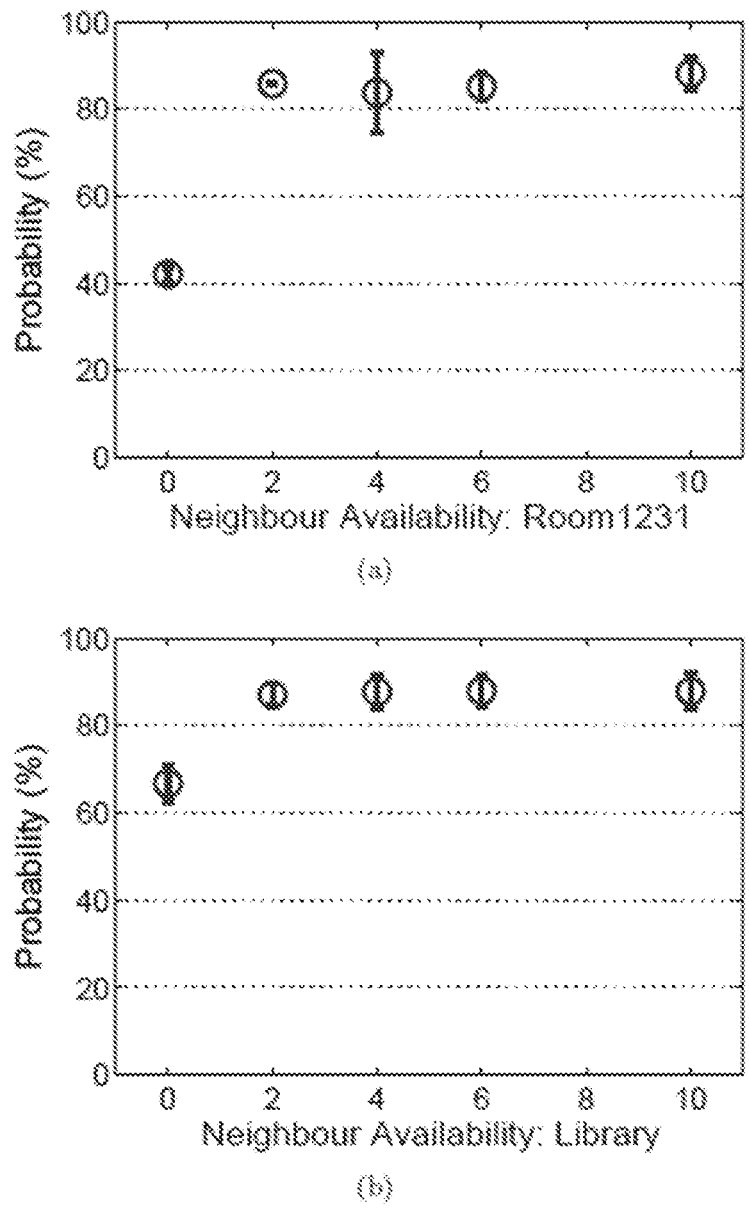
FIG. 27 illustrates the prediction probability for change in number of observed neighbor Base Stations at test locations (a) University Room 1231 (b) Library.

The overall prediction probability for various environments is shown in FIGS. 24 (a) and (b) for self-sourced and crowd-sourced data. Self-sourced data is the data which is stored in the user's phone via his movement patterns. Crowd-sourced data is the aggregated data collected from different user's data. We note that even though, the accuracy varies from location to location based on signal strengths and other BS availability conditions, we see that PILS provides better accuracy when compared to other matching algorithms such as base station set or cell ID matching (BSSET) and mean square error matching (MSE). MSE gets very low values because, the average signal strength values for various spots within an environment is almost the same and hence it is difficult to correctly identify them. Note that when BSSET and MSE techniques include the specialized sorting techniques used in PILS, they do not match to the performance shown in PILS mainly due to the statistical matching performed in PILS as opposed to average values used in BSSET and MSE. This is shown in FIG. 23 (a) and FIG. 23 (b). We also see that though the accuracy decreases slightly, it holds good for crowd-sourced data also. We also plot the localization error that occurs while predicting the location spots. We define the localization error as the amount of distance by which the correct location and the predicted location differ. This is shown in FIG. 24 (a) and FIG. 24 (b).

Figure 22:
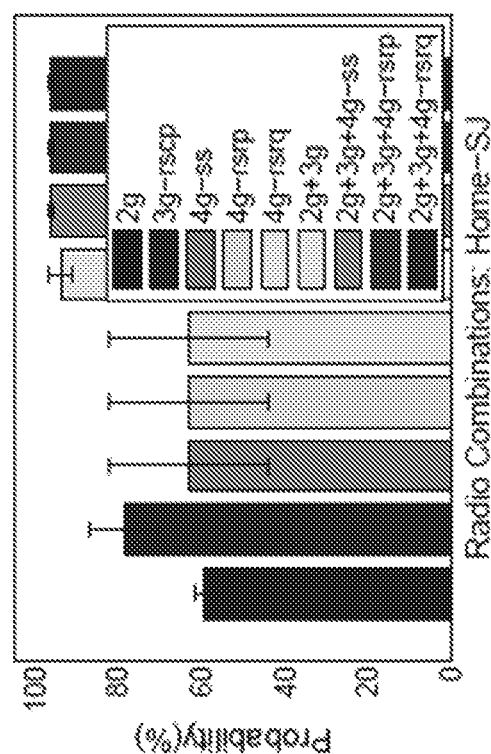
FIG. 22 illustrates the prediction probability for a test location named as Home-SJ. The different radio combinations are shown in different colored bars. The bars show average prediction probability and 95% confidence intervals error lines.

To evaluate the advantage of using the detailed statistical distribution of multiple radio signals, we plot the average prediction accuracy values of ATiS algorithm for different 2G, 3G and 4G radio combination signal strengths as shown in FIG. 22. For 4G radio, we include measurements for RSRP and RSRQ in addition to the regular RSSI measurements. We find that the individual radio types have varying prediction accuracies in the different locations. Combining two radio types increases the prediction accuracy but the combination of all three radio technologies always provide the highest accuracy for any location type. Thus, we justify our premise for using the multi-homing technique to localize in indoor settings. Also, this measurement study was performed at all the locations and is verified.

Accuracy Varies with Number of Base Stations

Figure 28:
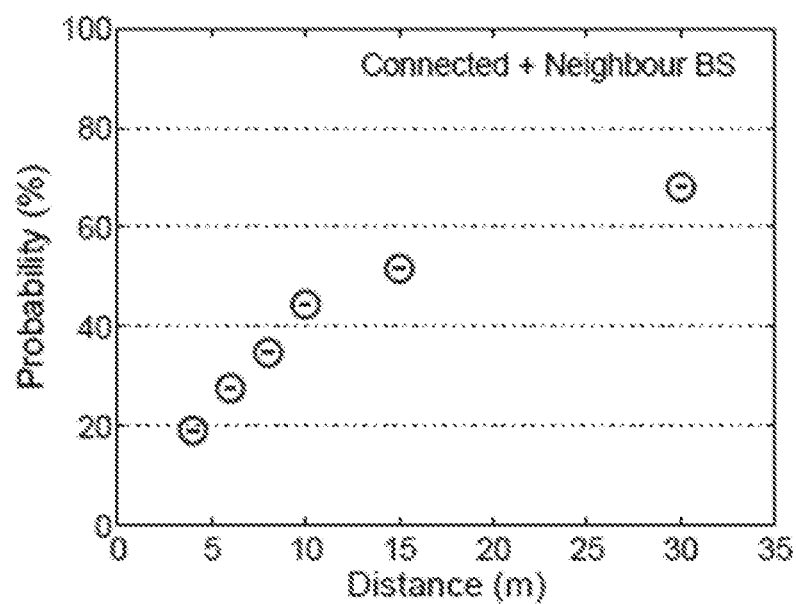
FIG. 28 illustrates the prediction probability for change in distance between adjoining test locations during hallway walk.

The prediction accuracy should increase with increase in number of observed base stations. The change in prediction probability with change in neighbor BS occurrence for different environment locations is shown in FIG. 26 and FIG. 28. We should also take care of the fact sometimes locations with more BS matches obtained less likelihood scores (e.g., 0.1*0.1 is less than 0.1). Since ATiS tunes the thresholds for a location based on the collective score for all observed BS's and not on per-BS score, it will result in these misclassifications. But, we avoided these misclassifications by sorting the predicted scores based on the number of BS matched in the signature. Hence, we were able to achieve higher prediction probability values.

But interestingly, we also found that for Mall, the prediction probability is very low (around 50%). This is due to the fact that mall location had very large open indoor space and it was very difficult to distinguish the adjoining location spots. So we tried an advanced technique to do path matching based on WiFi beacon value. To our expectation, we then received close to 80% prediction probability accuracy in Mall. However, more detailed measurements are needed in places such as mall where there are large open spaces within an indoor architecture for the shops.

RSRP Values Provide Better Accuracy than RSS Values

RSS values contain average signal power including power belonging to serving cells, co-channel cells, and thermal noise and are more prone to environmental degradation. PHY layer RSRP values are measured over cell-specific reference signals and are less prone to local perturbations in the environment. Also, the RSS values from 4G networks yield better prediction than RSS signals from 2G networks in office location due to presence of small cells in the buildings. In home location, the 4G towers were located far away than the 2G towers and hence, the RSS values were less helpful in differentiating the rooms. We observed the received signal strength values and the geographical coordinate of the base stations.

RSRQ Values Provide Less Accuracy when Used Alone

As explained in previous sections, RSRQ value is derived from RSRP and RSSI values. It is affected by adjacent channel interference and thermal noise and hence, when used alone, provides less accuracy than RSRP values. However, when RSRQ values are used alongside RSRP values, the prediction accuracy of the system is found to increase more than just using RSRP signals.

Radio Network Combinations Increase Accuracy

The prediction accuracy of the system increases with increased radio combination as opposed to one single radio type since the radio signal from particular signal technology may not hold good to distinguish locations at all places. The radio signal distributions for BSs in different radio networks vary for different locations. Hence, a radio combination can help avoid mis-classification rather than relying on a single radio network where two adjacent indoor locations might observe similar signal distributions over time. This further encourages our claim to use for multiple radio combination values. The graph is shown in FIG. 22.

Effect of Accuracy on Walking

In this section, we provide information about the variation in accuracy measurements with the different distance between adjacent spots during the hallway walk in our university campus building. The spots are located every 4 m apart up to 30 m apart. We can clearly see that the prediction probability increases with increased distance between the adjacent spots. Note that in these experiments, we do not use any path matching or accelerometer to track user movement. Hence receiving close to 60% prediction probability for hallway locations of 15 m is considered to be very positive result for practical applications. The graph is provided in FIG. 28.

Effect of Accuracy on Room Level Detection

In order to observe whether our solution will hold practical value in multiple environment scenarios, we made a set of measurements to check the accuracy of PILS which deciding on following things: inside or outside the home, inside or outside the classroom, etc. We received average prediction probability measurements above 70% for all locations tested. The results are shown for both all neighbors and zero neighbor (i.e., connected BS only) in FIGS. 29 (a) and (b) respectively. Hence, PILS can be a viable practical solution in terms of energy cost and deployment cost when considered with other approaches such as WiFi.

PILS makes no restrictions to the users in the way they hold their phones or the places they visit. Each user accumulated dynamic cellular signal variations from distinct antenna gains and antenna placement in their phones. Load balancing or Cell breathing techniques are used in CDMA systems where the BS output power is split among active users. Hence, coverage range of cellular towers is shrunk based on user load. In GSM and current LTE systems, each BS usually transmits with full transmission power in the downlink. Based on the location of the mobile within the coverage area, it receives a percentage of the transmitted power which PILS utilizes to logically localize locations. Hence, PILS is not directly affected by fluctuations due to cell balancing.

PILS constructs unique signatures in every device. With deeper knowledge on signal reception characteristics in different devices, a centralized database can be easily implemented and shared between users so that PILS can provide location estimations even in new places where the user has not previously visited. In recent months, many popular devices from Motorola, HTC, Sony and LG started providing the cellular signal values for all radio types due to the changes made in the Android operating system platform source code. Hence, the scope and impact of PILS is wide and relevant to current times.

An example rule (not given in XML format for the sake of clarity) input into decision engine is "do not connect to Wi-Fi hotspots at particular location". Hence, PILS filters its decision based on the rule-set in the decision engine. We see many potential applications for the decision engine in PILS (e.g., Cellular network carriers can dynamically modify data-offloading rules for their customers based on their real-time network congestion levels at a location. This can facilitate fast handover between Wi-Fi hotspot at a location and cellular data usage and readily complement commercial ISP solutions like Hotspot 2.0. Note that Hotspot 2.0 promises seamless Wi-Fi authentication and handoff, but still needs to identify locations with Wi-Fi.).

Figure 30:
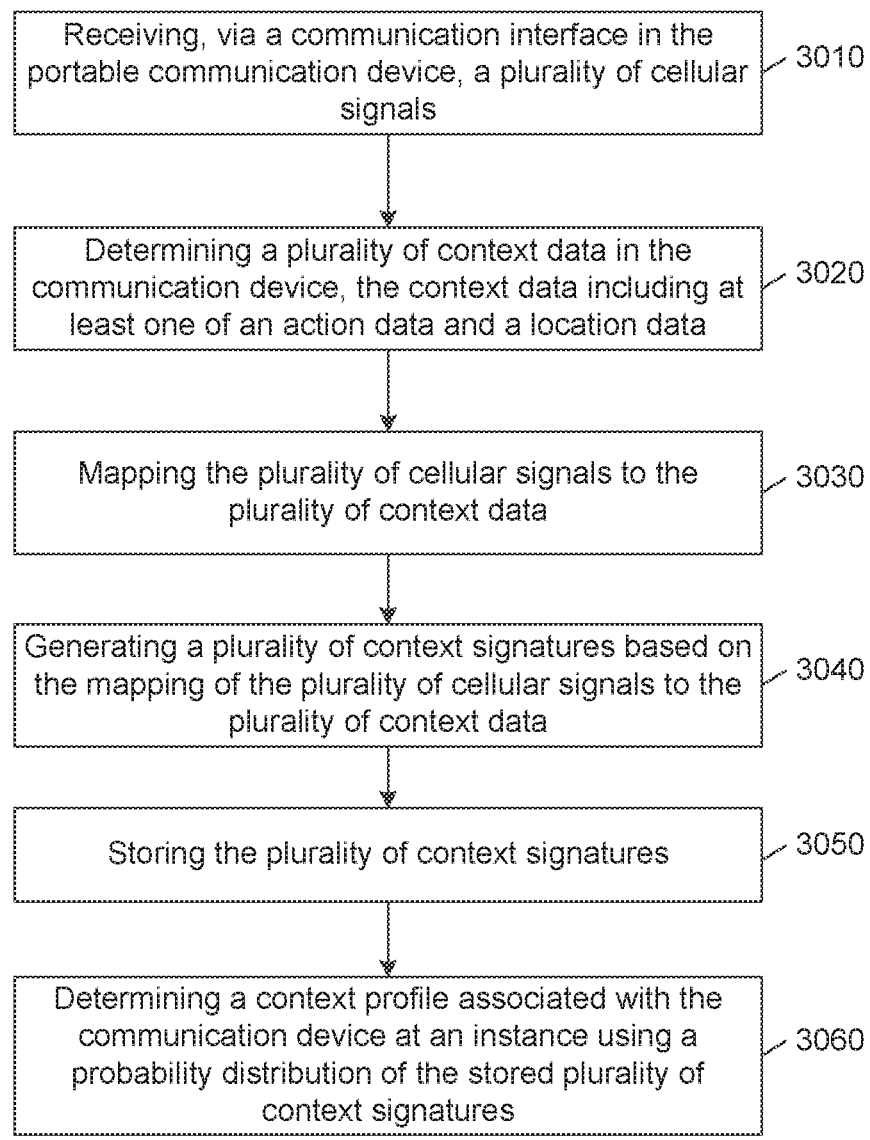
FIG. 30 is a flow chart of a method for determining a context profile associated with a portable communication device, in accordance with some embodiments.

FIG. 30 is a flow chart of a method for determining a context profile associated with a portable communication device, in accordance with some embodiments. At block 3010, the method includes receiving, via a communication interface in the portable communication device, a plurality of cellular signals. In some embodiments, receiving via the communication interface in the communication device, a plurality of cellular signals includes using at least one of a back channel parameter. In some embodiments, the back channel parameter is selected from the group consisting of a Received Signal Code Power (RSCP), a Reference Signal Received Power (RSRP), and a Reference Signal Received Quality (RSRQ). At block 3020, the method includes a plurality of context data in the communication device, the context data including at least one of an action data and a location data. An example for action data could be the process of accessing or using WiFi and the corresponding location data can be any of the sensor information such as GPS, Wi-Fi, Cell Signals and/or a variety of sensor signals. At block 3030, the method includes mapping the plurality of cellular signals to the plurality of context data. In some embodiments, the plurality of cellular signals is received from one or more cellular networks selected from a group consisting of a GSM network, a UMTS network, and an LTE network. At block 3040, the method includes generating a plurality of context signatures based on the mapping of the plurality of cellular signals to the plurality of context data. At block 3050, the method includes generating a plurality of context signatures based on the mapping of the plurality of cellular signals to the plurality of context data. At block 3050, the method includes storing the plurality of context signatures. At block 3060, the method includes determining a context profile associated with the communication device at an instance using a probability distribution of the stored plurality of context signatures. In some embodiments, generating the plurality of context signature includes determining a probability distribution of signal strength from one or more observable base stations at a location.

Described herein is an indoor localization that is configured to: utilize detailed statistical properties of cellular signals including both connected and neighbor base stations for GSM, UMTS, and LTE networks through cellular multi-homing. Also, described herein is a new context-aware indoor location detection system, PILS, which utilizes the freely available cellular signal information from multiple cellular generation networks to statistically map a context to the indoor location in a logical manner. A context or location signature is defined as the set of probability density functions (PDFs) of signal strengths from all observable Base Stations (BS) when the smart phone observes a context or when present at a location. PILS runs in the background and reads cellular signals based on a scheduling policy and hence consumes minimal energy overhead. We introduced a novel technique to dynamically build and update the signature clusters in near real-time and thus avoid the need for a specialized training phase. We developed a specialized non-parametric statistical matching algorithm which uses expectation maximization techniques based on Bayesian networks and automatically tunes the decision thresholds for every signature. We also implemented a XML rule-based decision engine to help facilitate sharing location information with any LBS applications.

In some embodiments, information about the feasibility of using such back-channel parameter (RSCP, RSRP, RSRQ) measurements in indoor localization efforts. To the best of our knowledge, we are the first to provide a working prototype implementation using these back-channel parameters. As a result, we hope that these network related parameters shall be opened up by the network operators to the research community and more detailed research on the factors will follow.

The present disclosure described herein and representative embodiments, are exemplary, and are not intended as limitations on the scope of the invention. Changes therein and other uses will occur to those skilled in the art which are encompassed within the spirit of the invention as defined by the scope of the claims.

Various features and advantages of embodiments of the invention are set forth in the following claims.

What is claimed is:

1. A method of determining a context profile associated with a portable communication device, the method comprising:

receiving, via a communication interface in the portable communication device, a plurality of cellular signals;

determining a plurality of context data in the communication device, the context data including at least one of an action data and a location data;

mapping the plurality of cellular signals to the plurality of context data;

generating a plurality of context signatures based on the mapping of the plurality of cellular signals to the plurality of context data;

storing the plurality of context signatures; and determining a context profile associated with the communication device at an instance using a probability distribution of the stored plurality of context signatures.

2. The method of claim 1, wherein generating the plurality of context signature includes determining a probability distribution of signal strength from one or more observable base stations at a location.

3. The method of claim 1, wherein receiving via the communication interface in the communication device, a plurality of cellular signals includes using at least one of a back channel parameter.

4. The method of claim 3, wherein the back channel parameter is selected from the group consisting of a Received Signal Code Power (RSCP), a Reference Signal Received Power (RSRP), and a Reference Signal Received Quality (RSRQ).

5. The method of claim 1, wherein the plurality of cellular signals is received from one or more cellular networks selected from a group consisting of a GSM network, a UMTS network, and an LTE network.

6. A portable communication device, the portable communication device comprising:
   an electronic processor configured to
   receive, via a communication interface, a plurality of cellular signals;
   determine a plurality of context data in the communication device, the context data including at least one of an action data and a location data;
   map the plurality of cellular signals to the plurality of context data;
   generate a plurality of context signatures based on the mapping of the plurality of cellular signals to the plurality of context data;
   store the plurality of context signatures; and
   determine a context profile associated with the communication device at an instance using a probability distribution of the stored plurality of context signatures.

7. The portable communication device of claim 6, wherein the electronic processor is further configured to
   determine a probability distribution of signal strength from one or more observable base stations at a location.

8. The portable communication device of claim 6, wherein the electronic processor is further configured to
   receive, via the communication interface, a plurality of cellular signals includes using at least one of a back channel parameter.

9. The portable communication device of claim 8, the back channel parameter is selected from the group consisting of Received Signal Code Power (RSCP), Reference Signal Received Power (RSRP), and Reference Signal Received Quality (RSRQ).

10. The portable communication device of claim 6, wherein the plurality of cellular signals is received from one or more cellular networks selected from a group consisting of a GSM network, a UMTS network, and an LTE network.

11. A non-transitory computer-readable medium containing computer-executable instructions that when executed by one or more processors in a portable communication device cause the one or more processors to:
    receive, via a communication interface in the portable communication device, a plurality of cellular signals;
    determine a plurality of context data in the communication device, the context data including at least one of an action data and a location data;
    map the plurality of cellular signals to the plurality of context data;
    generate a plurality of context signatures based on the mapping of the plurality of cellular signals to the plurality of context data;
    store the plurality of context signatures; and
    determine a context profile associated with the communication device at an instance using a probability distribution of the stored plurality of context signatures.

12. The non-transitory computer-readable medium of claim 11, further comprising instructions that when executed by a processor cause the processor to
    determine a probability distribution of signal strength from one or more observable base stations at a location.

13. The non-transitory computer-readable medium of claim 11, further comprising instructions that when executed by a processor cause the processor to
    receive, via the communication interface, a plurality of cellular signals includes using at least one of a back channel parameter.

14. The non-transitory computer-readable medium of claim 13, wherein the back channel parameter is selected from the group consisting of Received Signal Code Power (RSCP), Reference Signal Received Power (RSRP), and Reference Signal Received Quality (RSRQ).

15. The non-transitory computer-readable medium of claim 11, wherein the plurality of cellular signals is received from one or more cellular networks selected from a group consisting of a GSM network, a UMTS network, and an LTE network.

* * * * *